US010873437B2

(12) United States Patent
Yin et al.

(10) Patent No.: US 10,873,437 B2
(45) Date of Patent: Dec. 22, 2020

(54) SYSTEMS AND METHODS FOR FREQUENCY-DIVISION DUPLEX TRANSMISSION TIME INTERVAL OPERATION

(71) Applicants: Sharp Kabushiki Kaisha, Sakai (JP); FG Innovation Company Limited, Hong Kong (CN)

(72) Inventors: Zhanping Yin, Vancouver, WA (US); Toshizo Nogami, Vancouver, WA (US)

(73) Assignees: Sharp Kabushiki Kaisha, Osaka (JP); FG Innovation Company Limited, Hong Kong (CN)

( * ) Notice: Subject to any disclaimer, the term of this patent is extended or adjusted under 35 U.S.C. 154(b) by 5 days.

(21) Appl. No.: 15/673,128

(22) Filed: Aug. 9, 2017

(65) Prior Publication Data

US 2018/0048451 A1    Feb. 15, 2018

Related U.S. Application Data

(60) Provisional application No. 62/373,853, filed on Aug. 11, 2016.

(51) Int. Cl.
| | |
|---|---|
| *H04L 5/00* | (2006.01) |
| *H04L 1/18* | (2006.01) |
| *H04W 72/04* | (2009.01) |
| *H04W 72/12* | (2009.01) |
| *H04L 5/14* | (2006.01) |

(52) U.S. Cl.
CPC .......... *H04L 5/0055* (2013.01); *H04L 1/1854* (2013.01); *H04L 1/1861* (2013.01); *H04L 1/1887* (2013.01); *H04W 72/0446* (2013.01); *H04W 72/1268* (2013.01); *H04L 5/14* (2013.01); *H04W 72/1273* (2013.01)

(58) Field of Classification Search
CPC combination set(s) only.
See application file for complete search history.

(56) References Cited

U.S. PATENT DOCUMENTS

| | | | |
|---|---|---|---|
| 8,780,937 B2 | 7/2014 | Classon et al. | |
| 8,787,347 B2 | 7/2014 | Gorokhov et al. | |
| 2014/0226607 A1* | 8/2014 | Holma | H04L 1/1812 370/329 |

(Continued)

FOREIGN PATENT DOCUMENTS

WO    2014068279 A1    5/2014

OTHER PUBLICATIONS

Invitation to Pay Additional Fees issued for International Application No. PCT/US2017/046295 dated Oct. 18, 2017.

(Continued)

*Primary Examiner* — Muthuswamy G Manoharan
(74) *Attorney, Agent, or Firm* — Austin Rapp

(57) ABSTRACT

A user equipment (UE) is described. The UE includes a processor and memory in electronic communication with the processor. The UE configures shortened transmission time interval (sTTI) for downlink in a serving cell. The UE also determines a downlink (DL) association set for an uplink subframe. The UE further determines a shortened physical uplink control channel (SPUCCH) format or a PUCCH format used in the uplink subframe, on the basis of at least the number of downlink sTTI(s) within the DL association set.

4 Claims, 16 Drawing Sheets

(56) References Cited

U.S. PATENT DOCUMENTS

| | | | |
|---|---|---|---|
| 2018/0098337 A1* | 4/2018 | Lee | H04W 72/042 |
| 2018/0110062 A1* | 4/2018 | Byun | H04B 7/26 |
| 2018/0176943 A1* | 6/2018 | Takeda | H04W 72/0413 |
| 2018/0294942 A1* | 10/2018 | Byun | H04L 5/00 |
| 2018/0323907 A1* | 11/2018 | Takeda | H04L 1/1812 |
| 2019/0098622 A1* | 3/2019 | Lee | H04W 72/042 |
| 2019/0098653 A9* | 3/2019 | Nory | H04L 5/14 |

OTHER PUBLICATIONS

Huawei et al., "PUCCH design for short TTI", 3GPP TSG RAN WG1 Meeting #85, Nanjing, China, R1-164061, dated May 27, 2016.

Texas Instruments et al., "Way Forward on ARO Usage for TDD", 3GPP TSG RAN WG1 #72, St Julian's, Malta, R1-130763, Feb. 1, 2013.

"RAN1 Chairman's Notes," 3GPP TSG RAN WG1 Meeting #85, Nanjing, China May 27, 2016.

Huawei, HiSilicon, Ericsson, "Way forward on sTTI length", 3GPP TSG RAN WG1 #85, Nanjing, China, R1-165549, May 28, 2016.

LG Electronics, Ericsson, Panasonic, NTT DOCOMO, Sharp, KDDI, "Way Forward on sPUCCH design", 3GPP TSG RAN WG1 #85, Nanjing, China, R1-165544, May 27, 2016.

Ericsson, "Way forward on processing", 3GPP RAN WG1 #85, Nanjing, China, R1-165854, May 27, 2016.

Ericsson, "New Work Item on shortened TTI and processing time for LTE", 3GPP TSG RAN #72, Busan, Korea, RP-161299, Jun. 16, 2016.

International Search Report and Written Opinion issued for PCT Application No. PCT/US2017/046295 dated Dec. 12, 2017.

* cited by examiner

SYSTEMS AND METHODS FOR FREQUENCY-DIVISION DUPLEX TRANSMISSION TIME INTERVAL OPERATION

RELATED APPLICATIONS

This application is related to and claims priority from U.S. Provisional Patent Application No. 62/373,853, entitled "SYSTEMS AND METHODS FOR FREQUENCY-DIVISION DUPLEX TRANSMISSION TIME INTERVAL OPERATION," filed on Aug. 11, 2016, which is hereby incorporated by reference herein, in its entirety.

TECHNICAL FIELD

The present disclosure relates generally to communication systems. More specifically, the present disclosure relates to user equipments (UEs), base stations and methods.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
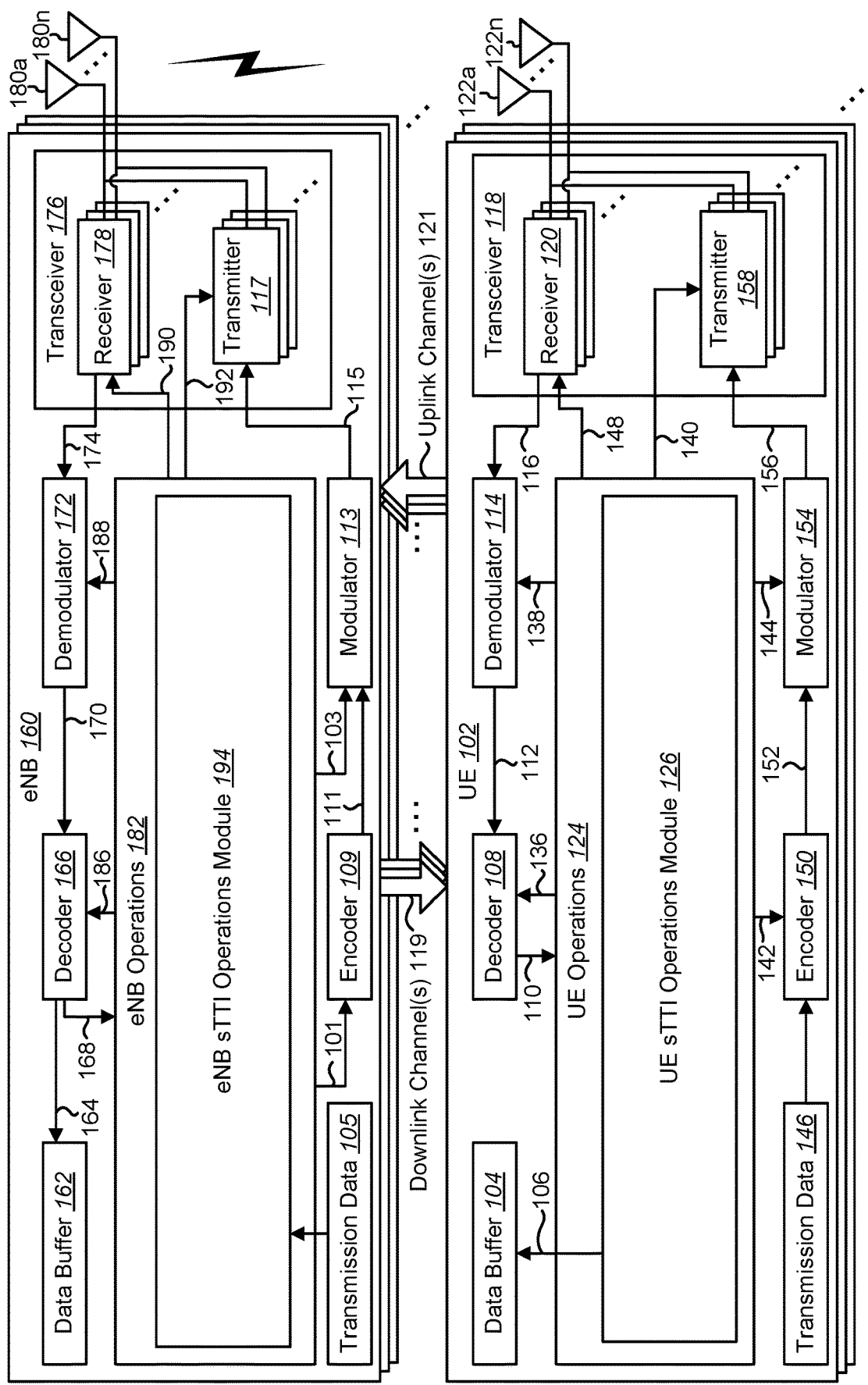
FIG. 1 is a block diagram illustrating an example of one or more evolved Node Bs (eNBs) and one or more user equipments (UEs) in which systems and methods for frequency-division duplex (FDD) transmission time interval (TTI) operation may be implemented.

A user equipment (UE) is described. The UE includes a processor and memory in electronic communication with the processor. The UE configures shortened transmission time interval (sTTI) for downlink in a serving cell. The UE also determines a downlink (DL) association set for an uplink subframe. The UE further determines a shortened physical uplink control channel (SPUCCH) format or a physical uplink control channel (PUCCH) format used in the uplink subframe on the basis of at least the number of downlink sTTI(s) within the DL association set.

In a case that sTTI for uplink is configured for the serving cell, the SPUCCH format may be used. In a case that sTTI for uplink is not configured for the serving cell, the PUCCH format may be used.

The SPUCCH format may be determined from multiple SPUCCH formats. The multiple SPUCCH formats may support different payload sizes.

A Hybrid Automatic Repeat Request Acknowledgement/Negative Acknowledgement (HARQ-ACK) resource offset (ARO) field may be included in a downlink control information (DCI) format. An SPUCCH resource may be determined using a value of the ARO field.

Another UE is described. The UE includes a processor and memory in electronic communication with the processor. The UE configures shortened transmission time interval (sTTI) for uplink in a serving cell. The UE also determines an uplink (UL) association set for a downlink subframe. The UE further determines an uplink sTTI from uplink sTTI(s) within the UL association set. The UE additionally receives a downlink channel in the downlink subframe. The UE also transmits an uplink channel in the uplink sTTI, the uplink channel corresponding to the downlink channel.

The downlink channel may be a physical downlink shared channel. The uplink channel may be an SPUCCH which carries HARQ-ACK for the physical downlink shared channel.

The downlink channel may be a physical downlink control channel. The uplink channel may be a shortened physical uplink shared channel (SPUSCH) which is scheduled by the physical downlink control channel.

The uplink sTTI may be indicated from the uplink sTTI(s) by a downlink control information (DCI) format. The uplink sTTI may be an initial sTTI of the uplink sTTI(s) in the UL association set. The uplink sTTI may be a last sTTI of the uplink sTTI(s) in the UL association set.

An evolved node B (eNB) is also described. The eNB includes a processor and memory in electronic communication with the processor. The eNB configures, for a UE, sTTI for downlink in a serving cell. The eNB also determines a DL association set for an uplink subframe. The eNB further determines an SPUCCH format or a PUCCH format used in the uplink subframe on the basis of at least the number of downlink sTTI(s) within the DL association set.

Another eNB is described. The eNB includes a processor and memory in electronic communication with the processor. The eNB configures, for a UE, sTTI for uplink in a serving cell. The eNB also determines an UL association set for a downlink subframe. The eNB further determines an uplink sTTI from uplink sTTI(s) within the UL association set. The eNB additionally transmits a downlink channel in the downlink subframe. The eNB also receives an uplink channel in the uplink sTTI, the uplink channel corresponding to the downlink channel.

A method for a UE is also described. The method includes configuring sTTI for downlink in a serving cell. The method also includes determining a DL association set for an uplink subframe. The method further includes determining a SPUCCH format or a PUCCH format used in the uplink subframe on the basis of at least the number of downlink sTTI(s) within the DL association set.

A method for an eNB is also described. The method includes configuring, for a UE, sTTI for downlink in a serving cell. The method also includes determining a DL association set for an uplink subframe. The method further includes determining a SPUCCH format or a PUCCH format used in the uplink subframe on the basis of at least the number of downlink sTTI(s) within the DL association set.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a user equipment (UE), an access terminal, a subscriber station, a mobile terminal, a remote station, a user terminal, a terminal, a subscriber unit, a mobile device, etc. Examples of wireless communication devices include cellular phones, smart phones, tablet devices, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may refer to any set of communication channels over which the protocols for communication between a UE and eNB that may be specified by standardization or governed by regulatory bodies to be used for International Mobile Telecommunications-Advanced (IMT-Advanced) or its extensions and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

It should be noted that the term "concurrent" and variations thereof as used herein may denote that two or more events may overlap each other in time and/or may occur near in time to each other. Additionally, "concurrent" and variations thereof may or may not mean that two or more events occur at precisely the same time.

The systems and methods discussed herein may relate to frequency-division duplex (FDD) transmission time interval (TTI) operation. For example, the systems and methods discussed herein may relate to FDD shortened TTI (sTTI) operation with latency reduction.

In latency reduction, different shortened transmit time interval (sTTI) lengths may be utilized. The reduced sTTI lengths may lead to reduced processing time and thus reduced round trip delay (e.g., round trip time (RTT)). Different scenarios of processing time reduction and RTT reduction with different sTTI sizes (particularly when the DL and UL have different TTI sizes, for example) are described herein. The reduced processing time may have impacts on association timing of: downlink (DL) Hybrid Automatic Hybrid Automatic Repeat Request Acknowledgement/Negative Acknowledgement (HARQ-ACK) reporting on an uplink (UL) subframe, UL physical uplink shared channel (PUSCH) scheduling from a DL subframe and/or UL HARQ-ACK feedback on a DL subframe for PUSCH transmission.

A fixed association timing may be defined based on the longer sTTI size between UL and DL. Different processing timings based on different sTTI sizes are described herein. Furthermore, solutions for potential issues raised with different processing times from different UEs or different sTTIs are provided herein. These solutions relate to sPUCCH collision between different UEs and sPUCCH adaptation based on the actual number of sPDSCH received within a DL association set in the case of a longer UL sTTI than a DL sTTI.

Semi-statically configured sTTI sizes on DL and UL are described in accordance with the systems and methods described herein. In some configurations, it may be assumed that a UE is not expected to receive sTTIs with different sizes within a legacy TTI. Additionally or alternatively, it may be assumed that a UE is not expected to transmit sTTIs with different sizes within a legacy TTI.

For sTTI sizes, the transmit time interval (TTI) lengths of UL and DL may be configured independently. Furthermore, the DL and UL channel may be configured independently (e.g., the shortened physical uplink control channel (sPUCCH) and shortened physical uplink shared channel (sPUSCH) may be configured with different sTTI sizes). For a frequency division duplex (FDD) cell, the processing delay may be scaled based on the configured TTI length. A DL TTI or sTTI may be associated with one or more UL TTI or sTTIs. A UL TTI or sTTI may be associated with one or more DL TTI or sTTIs.

For all association timing and processing delays on a FDD cell, several issues exist with different processing times for different UEs or different sTTIs. Detailed processing timing using a configurable delay (e.g., k, and m values) is described for sPDSCH HARQ-ACK reporting on a sTTI UL, sPUSCH scheduling by a sTTI DL and sPUSCH HARQ-ACK reporting on a sTTI DL.

Due to different processing times that may be applied for different UEs, the sPUCCH resource may collide between different UEs. To avoid this issue, a HARQ resource offset may be included in the DL assignment DCI.

Furthermore, if the DL sTTI is smaller than the UL sTTI, multiple DL sTTIs may be linked to a single UL sTTI for HARQ-ACK reporting. The HARQ-ACK reporting may use sPUCCH format adaptation. If only one sPDSCH is detected in the DL association set, a sPUCCH format with a small payload may be used. If more than one sPDSCH is detected in the DL association set, a PUCCH format with a large payload may be used.

In LTE release 12 and earlier, a transmission time interval (TTI) is a subframe with 1 millisecond (ms). For a reduced transmission time interval (R-TTI) for LTE, different TTI sizes are considered for both uplink (UL) and downlink (DL) TTI formats. A reduced TTI may also be referred as short TTI, shortened TTI (sTTI), etc.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating an example of one or more eNBs 160 and one or more UEs 102 in which systems and methods for frequency-division duplex (FDD) transmission time interval (TTI) operation may be implemented. The one or more UEs 102 communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

The UE 102 and the eNB 160 may use one or more channels 119, 121 to communicate with each other. For example, a UE 102 may transmit information or data to the eNB 160 using one or more uplink channels 121. Examples of uplink channels 121 include a PUCCH and a PUSCH, etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include a UE sTTI operations module 126. The UE sTTI operations module 126 may operate in accordance with one or more of the functions, methods, procedures, approaches, cases, examples and/or techniques described herein. For example, the UE sTTI operations module 126 may operate in accordance with the description given in connection with one or more of FIGS. 2-12.

The UE sTTI operations module 126 may determine a duplex method of a serving cell. For example, the UE sTTI operations module 126 may receive configuration information from the eNB 160 indicating whether the serving cell is a time-division duplex (TDD) cell or an FDD cell.

The UE sTTI operations module 126 may determine that a shortened transmission time interval (sTTI) is configured on one or more downlink subframes and/or uplink subframes. For example, the UE sTTI operations module 126 may receive configuration information from the eNB 160 indicating that sTTI is configured for one or mode downlink subframes and/or uplink subframes. Examples of sTTI formats may include slot-based, 1 orthogonal frequency-division multiplexing (OFDM) symbol, 2 OFDM symbols, 3 and 4 (3/4) OFDM symbols, and 7 OFDM symbols.

The UE sTTI operations module 126 may determine a sTTI downlink size and a sTTI uplink size. For example, the UE sTTI operations module 126 may receive configuration information from the eNB 160 that indicates the sTTI downlink size and the sTTI uplink size.

The UE sTTI operations module 126 may determine a processing time based on a scheduled transmission sTTI. For example, with a reduced TTI size, the processing time of a sTTI subframe may also be reduced. For the processing time of sPDSCH, the sTTI size may refer to the sPDSCH sTTI for the DL data to DL HARQ feedback timing. For the processing time of sPUSCH, the sTTI size may refer to the sPUSCH sTTI for the UL grant to UL data timing. For different UEs 102, different k values or m values may be applied. This may lead to different processing times for different UEs 102 even for the same sTTI sizes.

For sPUSCH transmissions, the eNB 160 may schedule UL resources based on the processing times of each UE 102. For sPDSCH transmissions, the HARQ-ACK feedback from different sTTI locations may be reported in the same UL sTTI from different UEs.

The UE sTTI operations module 126 may determine a Hybrid Automatic Repeat Request Acknowledgement/Negative Acknowledgement (HARQ-ACK) resource offset based on the processing time. In a case where a different processing time is applied to different UEs 102, a HARQ resource offset (ARO) field may be included in a DL assignment downlink control information (DCI) to avoid shortened physical uplink control channel (sPUCCH) collision between different UEs 102.

The UE sTTI operations module 126 may determine a downlink (DL) association set based on the processing time. In a case where the DL sTTI size is smaller than the UL sTTI size, the DL association set may be associated with a UL sTTI based on the processing time. For shortened physical downlink shared channel (sPDSCH) HARQ-ACK feedback, a sPUCCH adaptation may be applied. For example, if only one sPDSCH is detected in the DL association set, a sPUCCH with a small payload may be used. If more than one sPDSCH are detected in the DL association set, a sPUCCH with a large payload may be used.

An UL grant for sPUSCH and/or sPUSCH HARQ-ACK feedback may be signaled in a first DL sTTI of the DL association set. A UL grant for sPUSCH and/or sPUSCH HARQ-ACK feedback may be signaled in a first DL sTTI of the DL association set, in a last DL sTTI of the DL association set or in any DL sTTI of the DL association set.

The UE sTTI operations module 126 may determine an uplink (UL) association set based on the processing time. In a case where the DL sTTI size is larger than the UL sTTI size, the UL association set may be associated with a DL sTTI based on the processing time. For example, a sPDSCH HARQ-ACK feedback may be reported in a first UL sTTI of the UL association set, in a last UL sTTI of the UL association set or in a UL sTTI in the UL association set indicated by a DL assignment DCI. Furthermore, a UL grant for sPUSCH may include an index value or offset value indicating the sPUSCH transmission within the UL association set.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. For instance, the one or more transmitters 158 may transmit during a UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180*a-n*. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., HARQ-ACK information) that may be used by the eNB operations module 182 to perform one or more operations.

In general, the eNB operations module 182 may enable the eNB 160 to communicate with the one or more UEs 102. The eNB operations module 182 may include one or more of an eNB sTTI operations module 194. The eNB sTTI operations module 194 may operate in accordance with one or more of the functions, methods, procedures, approaches, cases, examples and/or techniques described herein. For example, the eNB sTTI operations module 194 may operate in accordance with the description given in connection with one or more of FIGS. 2-12.

The eNB sTTI operations module 194 may determine a duplex method of a serving cell. For example, the eNB sTTI operations module 194 may send configuration information to a UE 102 indicating whether the serving cell is a TDD cell or an FDD cell.

The eNB sTTI operations module 194 may determine that a shortened transmission time interval (sTTI) is configured on one or more downlink subframes and/or uplink subframes. For example, the eNB sTTI operations module 194 may send configuration information to the UE 102 indicating that sTTI is configured for one or mode downlink subframes and/or uplink subframes. Examples of sTTI formats may include slot-based, 1 orthogonal frequency-division multiplexing (OFDM) symbol, 2 OFDM symbols, 3 and 4 (3/4) OFDM symbols, and 7 OFDM symbols.

The eNB sTTI operations module 194 may determine a sTTI downlink size and a sTTI uplink size. For example, the eNB sTTI operations module 194 may send configuration information to the UE 102 that indicates the sTTI downlink size and the sTTI uplink size.

The eNB sTTI operations module 194 may determine a processing time based on a scheduled transmission sTTI. For example, with a reduced TTI size, the processing time of a sTTI subframe may also be reduced. For the processing time of sPDSCH, the sTTI size may refer to the sPDSCH sTTI for the DL data to DL HARQ feedback timing. For the processing time of sPUSCH, the sTTI size may refer to the sPUSCH sTTI for the UL grant to UL data timing. For different UEs 102, different k values or m values may be applied. This may lead to different processing times for different UEs 102 even for the same sTTI sizes.

For sPUSCH transmissions, the eNB 160 may schedule UL resources based on the processing times of each UE 102. For sPDSCH transmissions, the HARQ-ACK feedback from different sTTI locations may be reported in the same UL sTTI from different UEs.

The eNB sTTI operations module 194 may determine a Hybrid Automatic Repeat Request Acknowledgement/Negative Acknowledgement (HARQ-ACK) resource offset based on the processing time. In a case where a different processing time is applied to different UEs 102, a HARQ resource offset (ARO) field may be included in a DL assignment downlink control information (DCI) to avoid shortened physical uplink control channel (sPUCCH) collision between different UEs 102.

The eNB sTTI operations module 194 may determine a downlink (DL) association set based on the processing time. In a case where the DL sTTI size is smaller than the UL sTTI size, the DL association set may be associated with a UL sTTI based on the processing time. For shortened physical downlink shared channel (sPDSCH) HARQ-ACK feedback, a sPUCCH adaptation may be applied. For example, if only one sPDSCH is detected in the DL association set, a sPUCCH with a small payload may be used. If more than one sPDSCH are detected in the DL association set, a sPUCCH with a large payload may be used.

An UL grant for sPUSCH and/or sPUSCH HARQ-ACK feedback may be signaled in a first DL sTTI of the DL association set. A UL grant for sPUSCH and/or sPUSCH HARQ-ACK feedback may be signaled in a first DL sTTI of the DL association set, in a last DL sTTI of the DL association set or in any DL sTTI of the DL association set.

The eNB sTTI operations module 194 may determine an uplink (UL) association set based on the processing time. In a case where the DL sTTI size is larger than the UL sTTI size, the UL association set may be associated with a DL sTTI based on the processing time. For example, a sPDSCH HARQ-ACK feedback may be reported in a first UL sTTI of the UL association set, in a last UL sTTI of the UL association set or in a UL sTTI in the UL association set indicated by a DL assignment DCI. Furthermore, a UL grant for sPUSCH may include an index value or offset value indicating the sPUSCH transmission within the UL association set.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode information 101, including transmission data 105.

The encoder 109 may encode transmission data 105 and/or other information included in the information 101 provided by the eNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the eNB 160 to one or more UEs 102 and that a UL subframe may be transmitted from one or more UEs 102 to the eNB 160. Furthermore, both the eNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
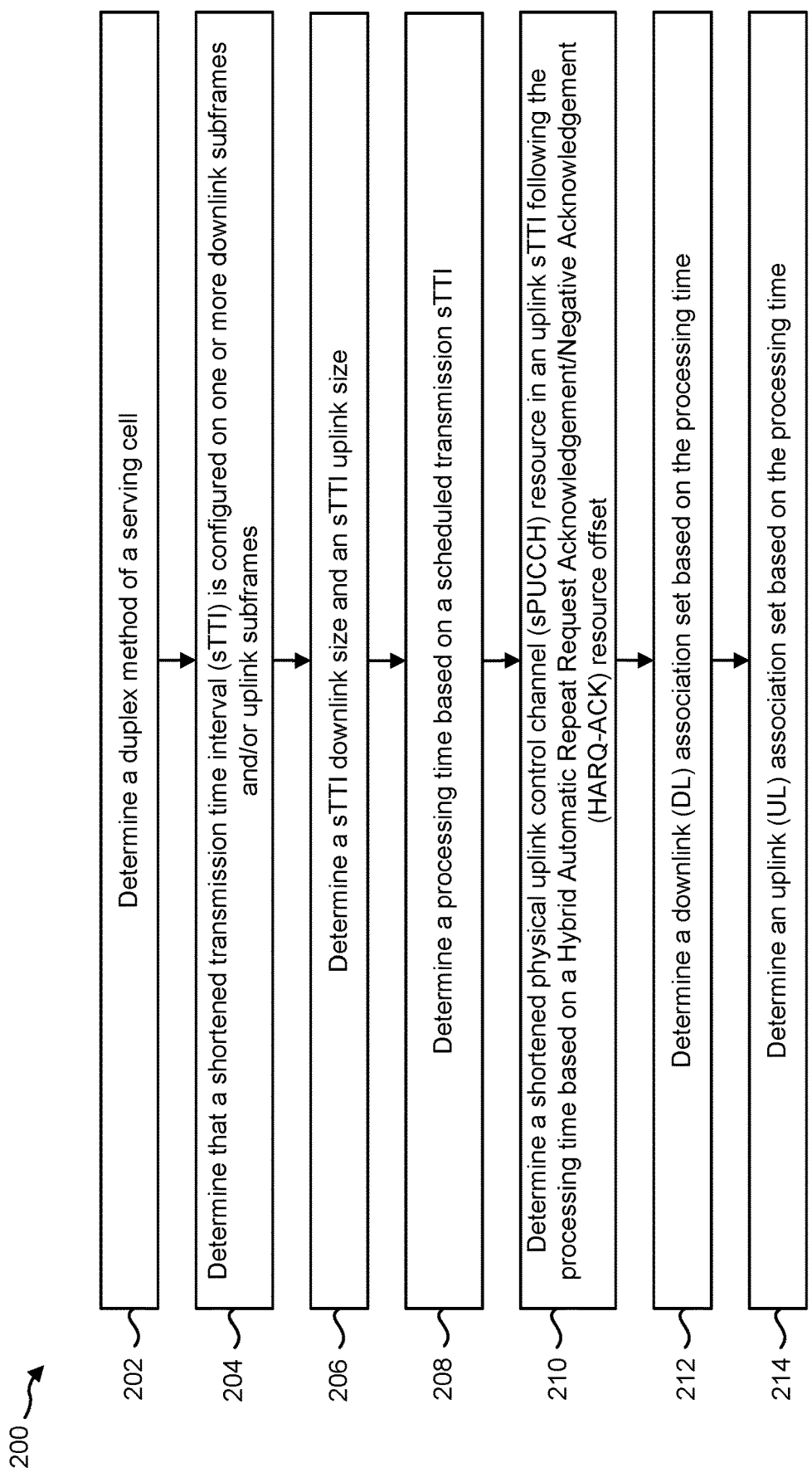
FIG. 2 is a flow diagram illustrating a method for frequency-division duplex (FDD) transmission time interval (TTI) operation.

FIG. 2 is a flow diagram illustrating a method 200 for frequency-division duplex (FDD) transmission time interval (TTI) operation. The method may be performed by a device (e.g., a UE 102 and/or an eNB 160). The device (e.g., a UE 102 and/or an eNB 160) may communicate with one or more other devices (e.g., an eNB 160 and/or a UE 102) in a wireless communication network. In some implementations, the wireless communication network may include an LTE network.

The device may determine 202 a duplex method of a serving cell. For example, the serving cell may be a TDD cell or an FDD cell.

The device may determine 204 that a shortened transmission time interval (sTTI) is configured on one or more downlink subframes and/or uplink subframes. For example, sTTI formats may include slot-based, 1 orthogonal frequency-division multiplexing (OFDM) symbol, 2 OFDM symbols, 3 and 4 (3/4) OFDM symbols, and 7 OFDM symbols.

The device may determine 206 a sTTI downlink size and a sTTI uplink size. For example, the device may receive configuration information from the eNB 160 that indicates the sTTI downlink size and the sTTI uplink size.

The device may determine 208 a processing time based on a scheduled transmission sTTI. For example, with a reduced TTI size, the processing time of a sTTI subframe may also be reduced. For the processing time of sPDSCH, the sTTI size may refer to the sPDSCH sTTI for the DL data to DL HARQ feedback timing. For the processing time of sPUSCH, the sTTI size may refer to the sPUSCH sTTI for the UL grant to UL data timing. For different UEs 102, different k values or m values may be applied. This may lead to different processing times for different UEs 102 even for the same sTTI sizes.

For sPUSCH transmissions, the eNB 160 may schedule UL resources based on the processing times of each UE 102. For sPDSCH transmissions, the HARQ-ACK feedback from different sTTI locations may be reported in the same UL sTTI from different UEs.

The device may determine 210 a shortened physical uplink control channel (sPUCCH) resource in an uplink sTTI following the processing time based on a Hybrid Automatic Repeat Request Acknowledgement/Negative Acknowledgement (HARQ-ACK) resource offset. In a case where a different processing time is applied to different UEs 102, a HARQ resource offset (ARO) field may be included in a DL assignment downlink control information (DCI) to avoid shortened physical uplink control channel (sPUCCH) collision between different UEs 102.

If different UEs are configured with the same UL sTTI length for sPUCCH, the sPUCCH collision issue may occur in several cases. In one case, the same DL sTTI length is configured for different UEs, but different processing times are applied for different UEs. In another case, different DL sTTI lengths are configured for different UEs, thus different processing times are applied for different UEs.

In case of sTTI is configured only for the downlink, and no shorten TTI is configured for the UL, a DL association set can also be formed for a UL TTI. The HARQ-ACK of sPDSCH in the DL association set can be reported on a 1 ms TTI UL, e.g. a PUCCH or PUSCH. The ARO bit can also be used to avoid collision between PUCCH transmission from different UEs.

The device may determine 212 a downlink (DL) association set based on the processing time. In a case where the DL sTTI size is smaller than the UL sTTI size, the DL association set may be associated with a UL sTTI based on the processing time. For shortened physical downlink shared channel (sPDSCH) HARQ-ACK feedback, a sPUCCH adaptation may be applied. For example, if only one sPDSCH is detected in the DL association set, a sPUCCH with a small payload may be used. If more than one sPDSCH are detected in the DL association set, a sPUCCH with a large payload may be used.

An UL grant for sPUSCH and/or sPUSCH HARQ-ACK feedback may be signaled in a first DL sTTI of the DL association set. A UL grant for sPUSCH and/or sPUSCH HARQ-ACK feedback may be signaled in a first DL sTTI of the DL association set, in a last DL sTTI of the DL association set or in any DL sTTI of the DL association set.

The device may determine 214 an uplink (UL) association set based on the processing time. In a case where the DL sTTI size is larger than the UL sTTI size, the UL association set may be associated with a DL sTTI based on the processing time. For example, a sPDSCH HARQ-ACK feedback may be reported in a first UL sTTI of the UL association set, in a last UL sTTI of the UL association set or in a UL sTTI in the UL association set indicated by a DL assignment DCI. Furthermore, a UL grant for sPUSCH may include an index value or offset value indicating the sPUSCH transmission within the UL association set.

Figure 3:
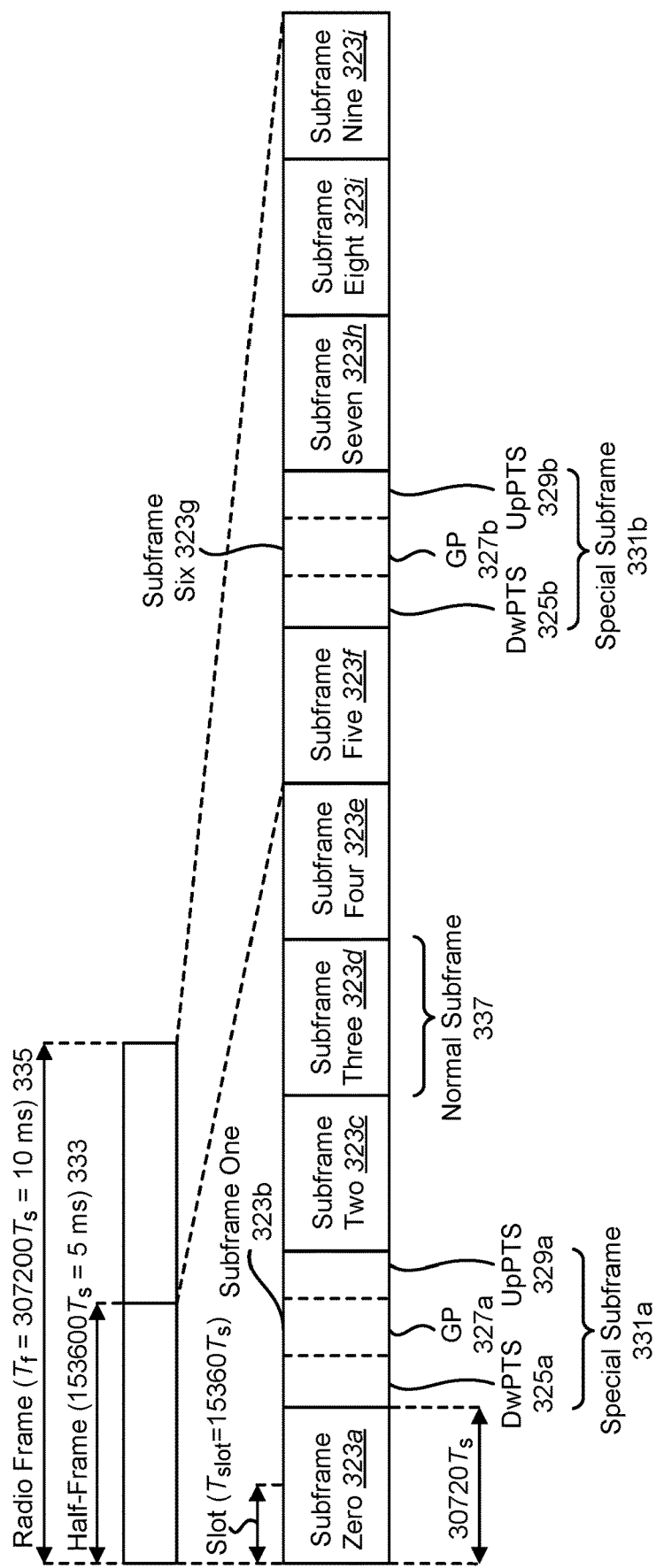
FIG. 3 is a diagram illustrating one example of a radio frame that may be used in accordance with the systems and methods disclosed herein.

FIG. 3 is a diagram illustrating one example of a radio frame 335 that may be used in accordance with the systems and methods disclosed herein. This radio frame 335 structure may provide a frame structure type 2 for TDD. Each uplink transmissions and "S" indicates a special subframe with three fields: a downlink pilot time slot (DwPTS), a guard period (GP) and an uplink pilot time slot (UpPTS). The length of DwPTS and UpPTS is given in Table 2 (from Table 4.2-1 of 3GPP TS 36.211) subject to the total length of DwPTS, GP and UpPTS being equal to $30720 \cdot T_s = 1$ ms. In Table 2, "cyclic prefix" is abbreviated as "CP" and "configuration" is abbreviated as "Config" for convenience.

TABLE 2

| | | Normal CP in downlink | | | Extended CP in downlink | |
|---|---|---|---|---|---|---|
| | | | UpPTS | | | UpPTS |
| Special Subframe Config | DwPTS | Normal CP in uplink | Extended CP in uplink | DwPTS | Normal CP in uplink | Extended CP in uplink |
| 0 | 6592 · Ts | 2192 · Ts | 2560 · Ts | 7680 · Ts | 2192 · Ts | 2560 · Ts |
| 1 | 19760 · Ts | | | 20480 · Ts | | |
| 2 | 21952 · Ts | | | 23040 · Ts | | |
| 3 | 24144 · Ts | | | 25600 · Ts | | |
| 4 | 26336 · Ts | | | 7680 · Ts | 4384 · Ts | 5120 · Ts |
| 5 | 6592 · Ts | 4384 · Ts | 5120 · Ts | 20480 · Ts | | |
| 6 | 19760 · Ts | | | 23040 · Ts | | |
| 7 | 21952 · Ts | | | — | — | — |
| 8 | 24144 · Ts | | | — | — | — | radio frame 335 may have a length of $T_f = 307200 \cdot T_s = 10$ ms, where $T_f$ is a radio frame 335 duration and $T_s$ is a time unit equal to $$\frac{1}{(15000 \times 2048)}$$

seconds. The radio frame 335 may include two half-frames 333, each having a length of $153600 \cdot T_s = 5$ ms. Each half-frame 333 may include five subframes 323a-e, 323f-j each having a length of $30720 \cdot T_s = 1$ ms.

TDD uplink/downlink (UL/DL) configurations 0-6 are given below in Table 1 (from Table 4.2-2 in 3GPP TS 36.211). UL/DL configurations with both 5 millisecond (ms) and 10 ms downlink-to-uplink switch-point periodicity may be supported. In particular, seven UL/DL configurations are specified in 3GPP specifications, as shown in Table 1 below. In Table 1, "D" denotes a downlink subframe, "S" denotes a special subframe and "U" denotes a UL subframe.

TABLE 1

| TDD UL/DL Configuration Number | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, for each subframe in a radio frame, "D" indicates that the subframe is reserved for downlink transmissions, "U" indicates that the subframe is reserved for UL/DL configurations with both 5 ms and 10 ms downlink-to-uplink switch-point periodicity are supported. In the case of 5 ms downlink-to-uplink switch-point periodicity, the special subframe exists in both half-frames. In the case of 10 ms downlink-to-uplink switch-point periodicity, the special subframe exists in the first half-frame only. Subframes 0 and 5 and DwPTS may be reserved for downlink transmission. UpPTS and the subframe immediately following the special subframe may be reserved for uplink transmission.

In accordance with the systems and methods disclosed herein, some types of subframes 323 that may be used include a downlink subframe, an uplink subframe and a special subframe 331. In the example illustrated in FIG. 3, which has a 5 ms periodicity, two standard special subframes 331a-b are included in the radio frame 335. The remaining subframes 323 are normal subframes 337.

The first special subframe 331a includes a downlink pilot time slot (DwPTS) 325a, a guard period (GP) 327a and an uplink pilot time slot (UpPTS) 329a. In this example, the first standard special subframe 331a is included in subframe one 323b. The second standard special subframe 331b includes a downlink pilot time slot (DwPTS) 325b, a guard period (GP) 327b and an uplink pilot time slot (UpPTS) 329b. In this example, the second standard special subframe 331b is included in subframe six 323g. The length of the DwPTS 325a-b and UpPTS 329a-b may be given by Table 4.2-1 of 3GPP TS 36.211 (illustrated in Table 2 above) subject to the total length of each set of DwPTS 325, GP 327 and UpPTS 329 being equal to $30720 \cdot T_s = 1$ ms.

Each subframe i 323a-j (where i denotes a subframe ranging from subframe zero 323a (e.g., 0) to subframe nine 323j (e.g., 9) in this example) is defined as two slots, 2i and 2i+1 of length $T_{slot} = 15360 \cdot T_s = 0.5$ ms in each subframe 323. For example, subframe zero (e.g., 0) 323a may include two slots, including a first slot.

UL/DL configurations with both 5 ms and 10 ms downlink-to-uplink switch-point periodicity may be used in accordance with the systems and methods disclosed herein. FIG. 3 illustrates one example of a radio frame 335 with 5 ms switch-point periodicity. In the case of 5 ms downlink-to-uplink switch-point periodicity, each half-frame 333 includes a standard special subframe 331*a-b*. In the case of 10 ms downlink-to-uplink switch-point periodicity, a special subframe 331 may exist in the first half-frame 333 only.

Subframe zero (e.g., 0) 323*a* and subframe five (e.g., 5) 323*f* and DwPTS 325*a-b* may be reserved for downlink transmission. The UpPTS 329*a-b* and the subframe(s) immediately following the special subframe(s) 331*a-b* (e.g., subframe two 323*c* and subframe seven 323*h*) may be reserved for uplink transmission. It should be noted that, in some implementations, special subframes 331 may be considered DL subframes in order to determine a set of DL subframe associations that indicate Uplink Control Information (UCI) transmission uplink subframes of a UCI transmission cell.

LTE license access with TDD may have the special subframe as well as the normal subframe. The lengths of DwPTS, GP and UpPTS may be configured by using a special subframe configuration. Any one of the following ten configurations may be set as a special subframe configuration.

1) Special subframe configuration 0: DwPTS consists of 3 OFDM symbols. UpPTS consists of 1 single carrier frequency-division multiple access (SC-FDMA) symbol.

2) Special subframe configuration 1: DwPTS consists of 9 OFDM symbols for normal CP and 8 OFDM symbols for extended CP. UpPTS consists of 1 SC-FDMA symbol.

3) Special subframe configuration 2: DwPTS consists of 10 OFDM symbols for normal CP and 9 OFDM symbols for extended CP. UpPTS consists of 1 SC-FDMA symbol.

4) Special subframe configuration 3: DwPTS consists of 11 OFDM symbols for normal CP and 10 OFDM symbols for extended CP. UpPTS consists of 1 SC-FDMA symbol.

5) Special subframe configuration 4: DwPTS consists of 12 OFDM symbols for normal CP and 3 OFDM symbols for extended CP. UpPTS consists of 1 SC-FDMA symbol for normal CP and 2 SC-FDMA symbol for extended CP.

6) Special subframe configuration 5: DwPTS consists of 3 OFDM symbols for normal CP and 8 OFDM symbols for extended CP. UpPTS consists of 2 SC-FDMA symbols.

7) Special subframe configuration 6: DwPTS consists of 9 OFDM symbols. UpPTS consists of 2 SC-FDMA symbols.

8) Special subframe configuration 7: DwPTS consists of 10 OFDM symbols for normal CP and 5 OFDM symbols for extended CP. UpPTS consists of 2 SC-FDMA symbols.

9) Special subframe configuration 8: DwPTS consists of 11 OFDM symbols. UpPTS consists of 2 SC-FDMA symbols. Special subframe configuration 8 may be configured only for normal CP 10) Special subframe configuration 9: DwPTS consists of 6 OFDM symbols. UpPTS consists of 2 SC-FDMA symbols. Special subframe configuration 9 may be configured only for normal CP.

Figure 4:
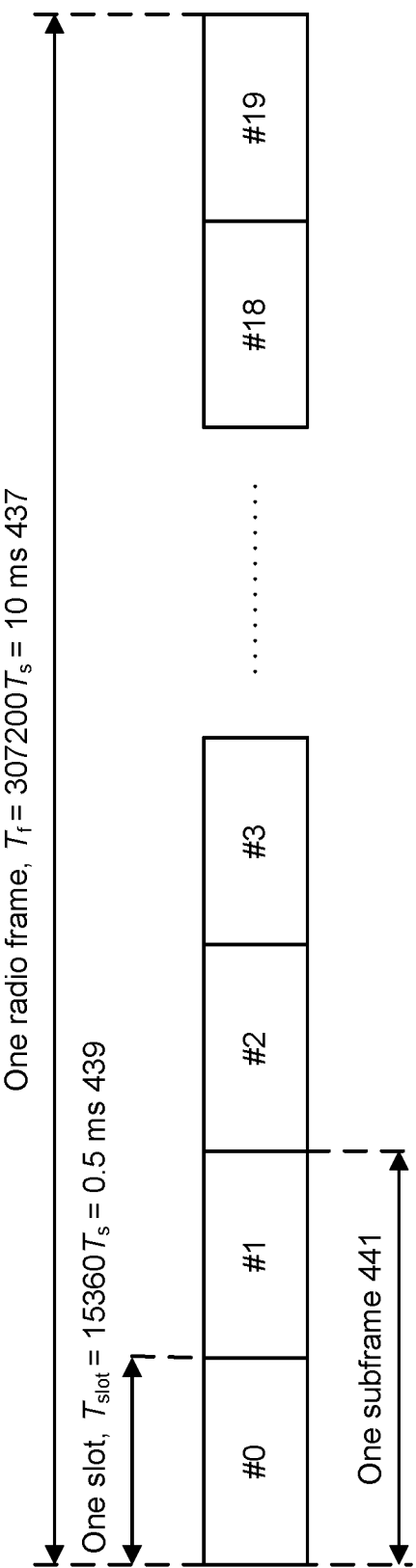
FIG. 4 is a diagram illustrating another example of a radio frame that may be used in accordance with the systems and methods disclosed herein.

FIG. 4 is a diagram illustrating another example of a radio frame 437 that may be used in accordance with the systems and methods disclosed herein. This radio frame 437 structure may provide a frame structure type 1 for FDD. Each radio frame 437 may have a length of $T_f=307200 \cdot T_s=10$ ms, where $T_f$ is a radio frame 437 duration and $T_s$ is a time unit equal to $$\frac{1}{(15000 \times 2048)}$$

seconds.

The radio frame 437 may include subframes 441. Each subframe 441 may be defined as two slots 439 of length $T_{slot}=15360 \cdot T_s=0.5$ ms in each subframe 441. The radio frame 437 includes twenty slots 439 (e.g., slots 0-19).

Figure 5:
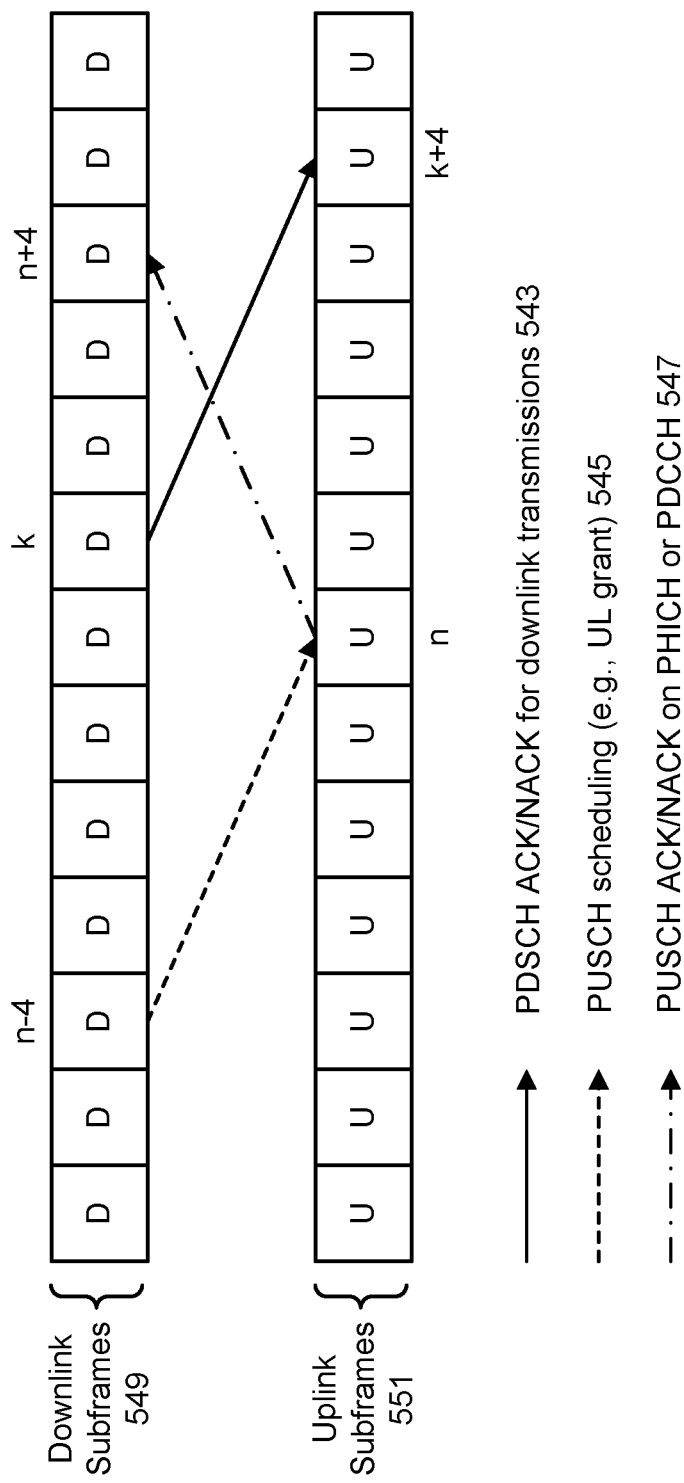
FIG. 5 is a diagram illustrating an example of timing for FDD cell operation.

FIG. 5 is a diagram illustrating an example of timing for FDD cell operation. For example, FIG. 5 illustrates some FDD association timing and operations. In particular, FIG. 5 illustrates a series of downlink subframes 549 (denoted "D") and a series of uplink subframes (denoted "U") 551. For FDD or frequency division duplex and time division duplex (FDD-TDD) and primary cell frame structure 1, the service cell operation may include several functions and corresponding timings. One function with corresponding timing may be PDSCH HARQ-ACK feedback timing 543. For FDD or FDD-TDD and primary cell frame structure 1, the HARQ-ACK for serving cell c is reported for the PDSCH received in subframe n−4 in serving cell c.

Another function (e.g., a second function) with corresponding timing may be PUSCH scheduling and transmission timing 545. For FDD and normal HARQ operation, the UE may, upon detection on a given serving cell of a PDCCH or enhanced PDCCH (EPDCCH) with DCI format 0/4 and/or a physical hybrid automatic repeat request (ARQ) indicator channel (PHICH) transmission in subframe n intended for the UE, adjust the corresponding PUSCH transmission in subframe n+4 according to the PDCCH/EPDCCH and PHICH information. For FDD-TDD and normal HARQ operation and a PUSCH for serving cell c with frame structure type 1, the UE may, upon detection of a PDCCH/EPDCCH with DCI format 0/4 and/or a PHICH transmission in subframe n intended for the UE, adjust the corresponding PUSCH transmission for serving cell c in subframe n+4 according to the PDCCH/EPDCCH and PHICH information.

Another function (e.g., a third function) with corresponding timing may be HARQ-ACK feedback timing for a PUSCH transmission 547. For FDD, and serving cell with frame structure type 1, a HARQ-ACK received on the physical hybrid automatic repeat request (ARQ) indicator channel (PHICH) assigned to a UE in subframe i is associated with the PUSCH transmission in subframe i−4. For FDD-TDD, and serving cell with frame structure type 1, and a UE not configured to monitor PDCCH/EPDCCH in another serving cell with frame structure type 2 for scheduling the serving cell, a HARQ-ACK received on the PHICH assigned to a UE in subframe i may be associated with the PUSCH transmission in subframe i−4. Besides PHICH feedback, PUSCH HARQ-ACK may be asynchronous by using a PDCCH/EPDCCH with DCI format 0/4 by a new date indicator (NDI). Accordingly, FDD based timing may follow a rule of 4 milliseconds (ms) (e.g., 4 regular or legacy TTI, as illustrated in FIG. 5).

Figure 6:
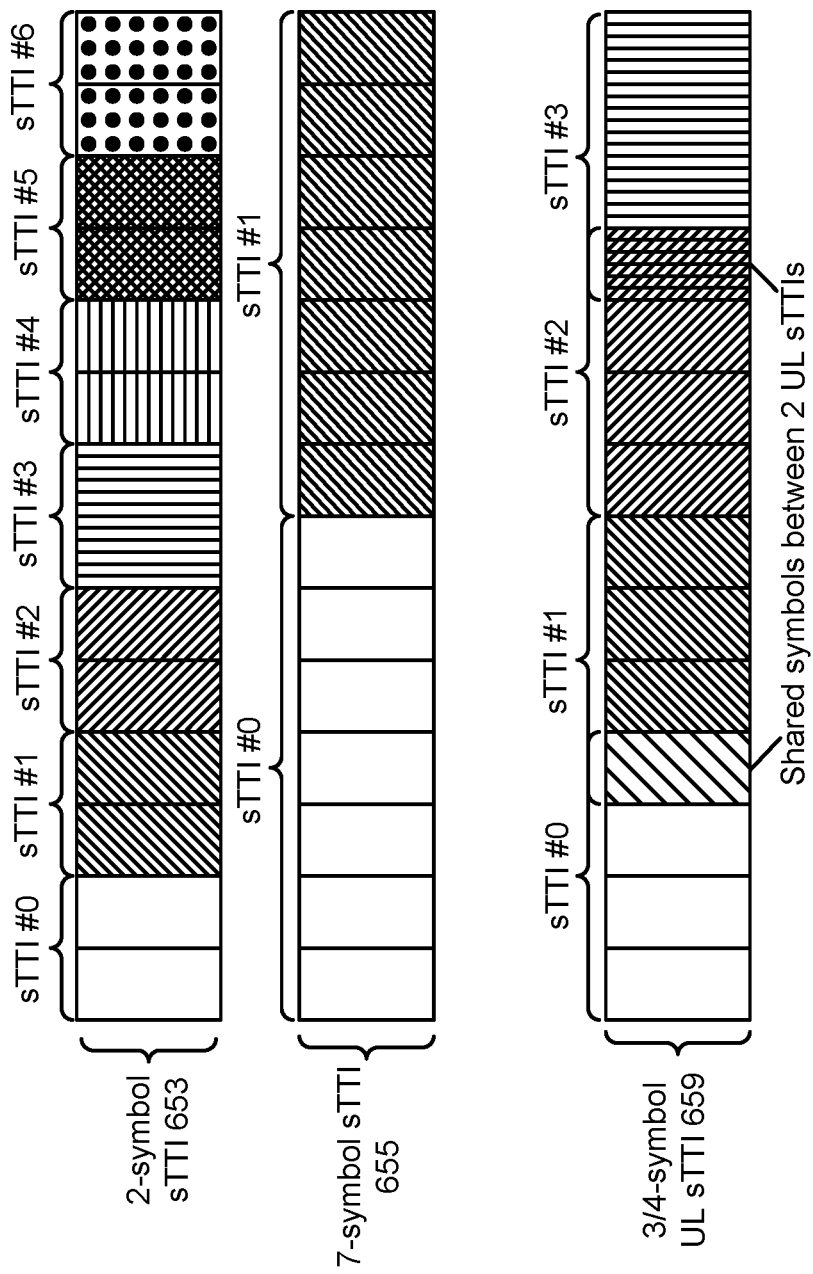
FIG. 6 is a diagram illustrating examples of timings with shortened transmission time intervals (sTTIs) for latency reduction.

FIG. 6 is a diagram illustrating examples of timings with shortened transmission time intervals (sTTIs) for latency reduction. For example, FIG. 6 illustrates examples of sTTI sizes and configurations for DL and UL. Shortened TTI (sTTI) may be defined for latency reduction for DL and UL transmissions. With a reduced TTI size, the processing time of a sTTI subframe may also be reduced. Thus, the association timing and RTT may be reduced accordingly. From a UE's perspective, a UE may not be expected to receive DL sTTIs with different sizes within a legacy subframe. Additionally or alternatively, a UE may not be expected to transmit UL sTTIs with different sizes within a legacy subframe.

Some assumptions may be made at least for FDD. For example, 2-symbol sTTI and 1-slot sTTI for sPDSCH/sPDCCH may be supported. 2-symbol sTTI, 4-symbol sTTI, and 1-slot sTTI for sPUCCH/sPUSCH may also be supported. Down-selection is not precluded.

Some examples of sTTI sizes and configurations are illustrated in FIG. 6. For 2-symbol sTTI 653, each legacy subframe may be divided into 7 2-symbol sTTIs. For a slot based 7-symbol sTTI 655, each legacy subframe may be divided into 2 7-symbol sTTIs. For 3 and 4 (3/4) symbol UL sTTI 659, each slot may be divided into two 4-symbol sTTIs that share a common symbol in the middle symbol of the slot.

The minimum processing time may be defined for each sTTI size based on the scheduled transmission sTTI size, as given below: The minimum timing for an UL grant to UL data and for DL data to DL HARQ may be n+k sTTI for short TTI operation. The processing time may be greater than or equal to (i.e., >=) the legacy processing time linearly downscaled with TTI length, where 4<=k<=8.

Processing time may be lower than the legacy processing time linearly downscaled with TTI length for at least slot based TTI, where k<4 for slot based TTI. It should be noted that sTTI refers to sPUSCH sTTI for the UL grant to UL data timing and sPDSCH sTTI for the DL data to DL HARQ feedback timing. How to the handle the minimum timing for the case when DL sTTI and UL sTTI have different lengths may be further defined.

The eNB 160 may indicate an additional parameter m. The value of m may be dependent on the discussion on the max TA), resulting in a timing of n+k+m sTTI. Configuration of m may be semi-static or dynamic.

For the processing time of sPDSCH, the sTTI size may refer to the sPDSCH sTTI for the DL data to DL HARQ feedback timing. For the processing time of sPUSCH, the sTTI size may refer to the sPUSCH sTTI for the UL grant to UL data timing. The k and m values may be defined or indicated in several different ways:

In one approach, the k value is fixed and specified for each sTTI size (e.g., k=4 for 1-slot sTTI, k=6 for 3/4-symbol sTTI, k=8 for s-symbol sTTI). The m value can be semi-statically configured for a UE 102 via higher layer signaling, m value can be configured in cell-specific or a UE-specific manner. This may require a minimum signaling for the processing time reduction. With this approach, the k value may be fixed based on the sTTI size, and is applicable to all latency reduction capable UEs 102.

In another approach, both the k and m value may be semi-statically configured, thus, the k value may be UE-specific. In yet another approach, the m value can be semi-statically configured, the k value can be dynamically indicated by 2 bits or 3 bits in a DCI format.

In yet another approach, the total processing time may be indicated in DCI for the sum of (k+m), and the UE 102 should always follow the indicated processing time. With this approach, there is no need to further define an m parameter.

The k value and m value may be configured independently for the sPDSCH and sPUSCH operations. The k value and m value may be configured differently for different sTTI lengths.

For different UEs 102, different k values or m values may be applied. This will lead to different processing time for different UEs 102 even for the same sTTI sizes. For sPUSCH transmissions, the eNB 160 may schedule UL resources based on the processing times of each UE. For sPDSCH transmissions, the HARQ-ACK feedback from different sTTI locations may be reported in the same UL sTTI from different UEs 102. This may lead to PUCCH collision issues between different UEs 102 if implicit PUCCH mapping is applied similar to current LTE systems. To avoid potential PUCCH collision issue, an HARQ resource offset (ARO) field may be included in the DCI format for sPDSCH assignment.

In one case, the DL sTTI size may be (e.g., is always) the same as the UL sTTI size for a given UE 102. The same sTTI size may be applied to all DL and UL channels (e.g., sPUSCH, sPUCCH, sPDSCH, etc.). For FDD or FDD-TDD and primary cell frame structure 1, as an extension, if the same sTTI size is used on both DL and UL, the minimum association timing may be linearly scaled with the sTTI sizes (e.g., the length of 4 sTTI for the PDSCH HARQ-ACK feedback timing, PUSCH scheduling and transmission timing, and/or HARQ-ACK feedback timing for a PUSCH transmission). Furthermore, considering the processing time required for different sTTI sizes, for a given sTTI size, a UE 102 can be configured with a k value that is greater than 4 and smaller or equal to 8, as given above. And a UE may be further configured with a m value for extra processing time due to large maximum TA values.

In another case, the DL sTTI size may be the same or different from the UL sTTI size, and the DL sTTI size and the UL sTTI size may be configured independently. Especially, if 3/4-symbol sTTI is supported and configured for UL (e.g., for sPUCCH, the UL and DL sTTI may always be different). Furthermore, the sTTI size may be configured independently for each channel (e.g., sPUCCH and sPUSCH may be configured with different sTTI sizes for a UE, sPHICH and sPDSCH may be configured with different sTTI sizes, etc.).

One remaining issue is how the serving cell should operate if the sTTI size of the DL is different from the sTTI size of the UL. Two cases are described where the DL and UL sTTI sizes are different.

In Case 1, the DL TTI is shorter than the UL TTI. In Case 1, for FDD or FDD-TDD and primary cell frame structure 1, the DL sTTI size is smaller than the UL sTTI size. Thus, multiple DL sTTIs may be mapped to a single UL TTI or sTTI.

More detail is given regarding sPDSCH HARQ-ACK feedback timing as follows. For the processing time of sPDSCH, the sTTI size refers to the sPDSCH sTTI for the DL data to DL HARQ feedback timing. For sPDSCH HARQ-ACK reporting, the HARQ-ACK of multiple DL sTTIs may be aggregated and reported in a single UL sTTI or TTI. For a sPDSCH in DL sTTI n, with a minimum processing time of n+k or n+k+m if m is configured, the processing time is normally more than the minimum configured processing time since the minimum time ends in the middle of a UL sTTI, and has to be postponed to the next UL sTTI.

Figure 7:
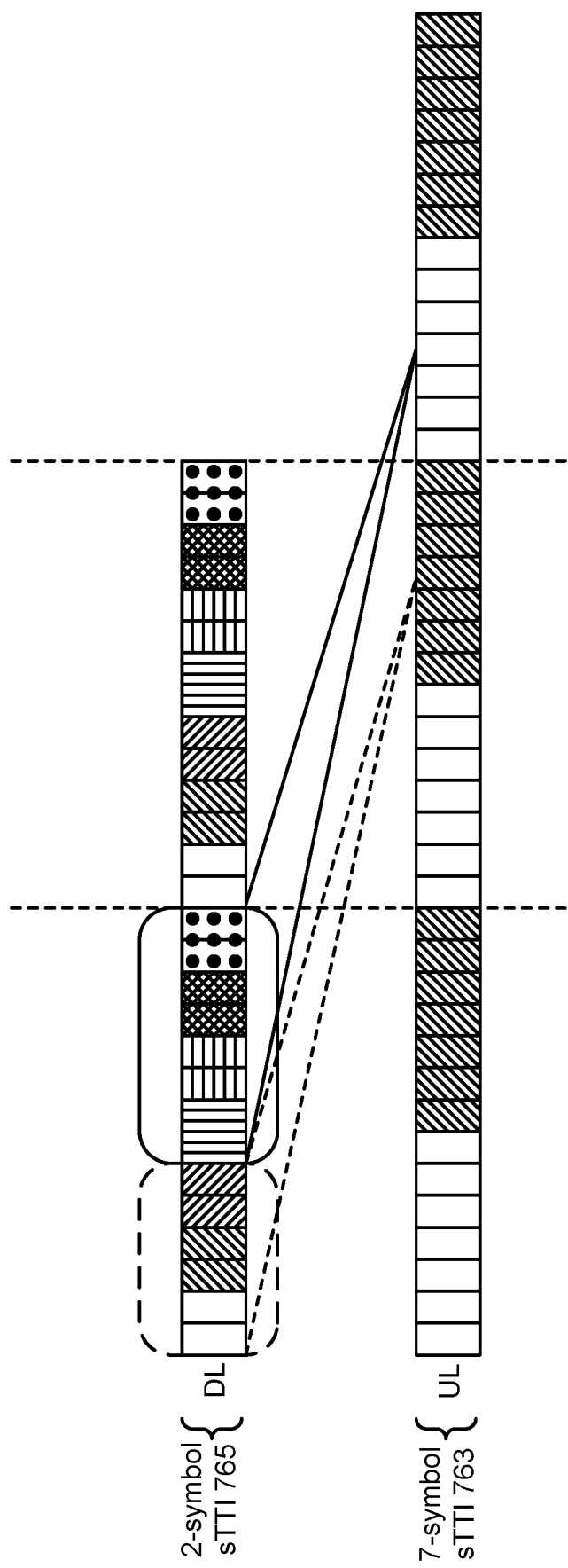
FIG. 7 is a diagram illustrating examples of shortened physical downlink shared channel (sPDSCH) Hybrid Automatic Repeat Request Acknowledgement/Negative Acknowledgement (HARQ-ACK) association with 7-symbol UL sTTI.

FIG. 7 is a diagram illustrating examples of sPDSCH HARQ-ACK association with 7-symbol UL sTTI 763. In particular, FIG. 7 illustrates an example of a mapping when the UL sTTI size is 7-symbol and the DL sTTI size is 2-symbol with processing time as n+8 based on sPDSCH sTTI size. For a 2-symbol sTTI 765 crossing a slot boundary, the HARQ-ACK may be reported together with sTTIs in the later slot. Thus, a 7-symbol UL sTTI 763 may associate with 4 or 3 2-symbol sTTIs 765 for UL sTTI in slot 0 and slot 1, respectively.

The multiple DL sTTIs associated with a single UL sTTI may form a DL association set for the given UL sTTI. The DL association set may include all DL sTTIs that end in a UL sTTI. The actual processing times for each DL sTTI in the two DL association sets are {10.5, 9.5, 8.5}, {11, 10, 9, 8} in terms 2-symbol DL sTTI 765 length. In another method, if a DL association set is treated as a UL sTTI, the processing time can be simplified to 3 UL sTTIs.

Figure 8:
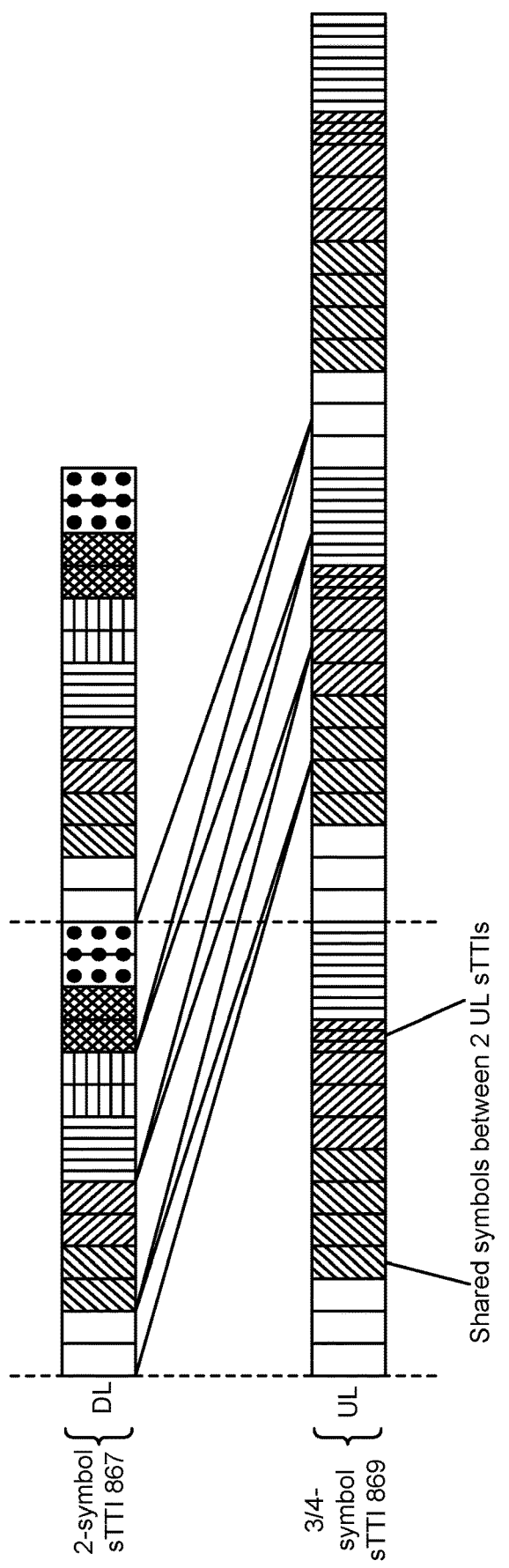
FIG. 8 is a diagram illustrating examples of physical downlink shared channel (PDSCH) HARQ-ACK association with 3/4-symbol uplink (UL) sTTI.

FIG. 8 is a diagram illustrating examples of PDSCH HARQ-ACK association with 3/4-symbol UL sTTI 869. In particular, FIG. 8 illustrates the mapping when the UL sTTI size is 3/4-symbol and DL sTTI size is 2-symbol with a processing time as n+8 based on sPDSCH sTTI size. Thus, a UL sTTI may associate with 2 DL sTTIs or 1 DL sTTI depending on the sTTI location in a subframe. The multiple DL sTTIs associated with a single UL sTTI forms a DL association set for the given UL sTTI. The DL association set includes all DL sTTIs that ends in a UL sTTI. The actual processing times for each DL sTTI in these DL association sets are {8.5}, {9.5, 8.5}, {9,8}, {9, 8} in terms 2-symbol DL sTTI 867 length. In another method, if a DL association set is treated as a UL sTTI, the processing time can be simplified to 5 UL sTTIs. If k=6 is defined for the 3/4-symbol minimum processing time, this results in processing time of (k−1) in terms of the longer sTTI size.

Therefore, some methods need to be specified to support multiple sPDSCH HARQ-ACK reporting in the same UL sTTI (e.g., on a sPUCCH). The multiple DL sTTIs associated with a single UL sTTI forms a DL association set for the given UL sTTI.

To indicate the number of sPDSCH assigned for a given UE, a downlink assignment index (DAI) value may be included in the DL assignment DCI. The DAI value indicates the number of sPDSCH assigned to a given UE within the DL association set of a given UL sTTI.

In the latency reduction with sTTI, at least two sPUCCH formats may be specified. A sPUCCH format 1 or a low payload sPUCCH format may be specified to report HARQ-ACK and/or Scheduling Request (SR) for a serving cell (e.g., only 1 or 2 bits of HARQ-ACK). A sPUCCH format 2, or a higher payload sPUCCH format, may be specified to report more than 2 HARQ-ACK bits, as in a carrier aggregation (CA) case.

The following sPUCCH formats may be supported. One sPUCCH format for HARQ-ACK and/or SR feedback for a serving cell may be supported. sPUCCH format(s) for multiple HARQ-ACK bits may also be supported (e.g., as in CA and frame structure type 2). The amount of sPUCCH formats to support may depend on the maximum identified payload size to support. The sPUCCH format may allow for multiplexing of HARQ-ACK and SR. sPUCCH format may support Channel State Information (CSI) feedback.

With multiple DL sTTIs associated with a UL sTTI, PUCCH format adaptation may be used. A UE may be configured with a sPUCCH format 1 resource and a sPUCCH format 2 resource. If only one sPDSCH is detected in the DL association set, the UE may report HARQ-ACK using the sPUCCH format 1 resource. If more than one sPDSCH is detected in the DL association set, the UE may report HARQ-ACK of multiple sPDSCH in the sPUCCH format 2 resource.

The sPUCCH format 1 resource may be implicitly mapped based on the starting position of a DL assignment DCI. The sPUCCH format 1 resource may be explicitly configured by higher layer signaling.

If sPUCCH format 2 is used to report the HARQ-ACK of more than 1 sTTIs, the HARQ-ACK of all DL sTTIs in the DL association set should be reported. If there are more than 1 codeword or Transport Block (TB) in a sTTI, the HARQ-ACK bits of the TBs may be spatial bundled to generate one HARQ-ACK bit for a DL sTTI. In one method, the HARQ-ACK bits may be arranged based on the DAI index of each sTTI, discontinuous transmission (DTX) and/or negative acknowledgment (NACK) can be padded for other sTTIs after. In another method, the HARQ-ACK bits may be multiplexed based on the sTTI ordering.

The above mentioned sPUCCH format adaptation method also applies to single UE operation if multiple DL sTTI are associated with a single UL sTTI (e.g., different DL sTTI is scheduled with different k values, and more than one DL sTTI is pointed to the same UL sTTI for HARQ-ACK feedback).

Furthermore, the sPUCCH format adaption method also applies to sTTI operation in a TDD network (i.e., subframe structure type 2) and a licensed-assisted access (LAA) network (i.e., subframe structure type 3) if multiple DL sTTIs are associated with a single UL sTTI. If shortened TTI is configured only on the downlink, and no shortened TTI is configured for the UL, a DL association set is formed to a 1 ms TTI, and PUCCH format adaptation method can be applied (i.e., if only 1 sPDSCH is detected within the DL association set, PUCCH format 1a/1b can be used to report HARQ-ACK of the sPDSCH). If more than one sPDSCH is detected in the DL association set, a configured PUCCH format (e.g., PUCCH format 3 or format 4 or format 5) is used to report HARQ-ACK bits of all DL sTTIs in the DL association set.

More detail regarding sPUSCH scheduling and transmission timing is given as follows. For sPUSCH scheduling processing time, the sPUSCH sTTI is used to determine the minimum processing time of n+k or n+k+m if m is configured. Since the DL sTTI is smaller than the UL sTTI, one UL sTTI may covers more than one DL sTTIs. Thus, if a UE detects an UL grant within a UL sTTI n, the UE should transmit a sPUSCH in UL sTTI n+k, or n+k+m if m is configured. The multiple DL sTTIs associated with a single UL sTTI forms a DL association set for the given UL sTTI. The DL association set includes all DL sTTIs that ends in a UL sTTI. Since there may be multiple DL sTTIs included in the UL sTTI, multiple methods may be considered.

In Method A1, only the last DL sTTI that ends within the range of UL sTTI n can be used for a UL grant of a sPUSCH in UL sTTI n+k or n+k+m if m is configured. This minimizes the latency between a UL grant and the UL transmission. When the same DL association set is used for sPDSCH HARQ-ACK feedback, only the first DL sTTI in the DL association set can be used for UL grant with Method A1.

In Method A2, only the earliest DL sTTI that ends within the range of UL sTTI n can be used for a UL grant of a sPUSCH in UL sTTI n+k or n+k+m if m is configured. This provides slightly more processing time between a UL grant and the UL transmission. When the same DL association set is used for sPDSCH HARQ-ACK feedback, only the last DL sTTI in the DL association set can be used for UL grant with Method A2. In a variation of Method A2, only the first DL sTTI that starts within the range of UL sTTI n can be used for a UL grant of a sPUSCH in UL sTTI n+k or n+k+m if m is configured.

In Method A2, any DL sTTI that ends within the range of UL sTTI n can be used for a UL grant of a sPUSCH in UL sTTI n+k or n+k+m if m is configured. This method provides better flexibility on sPUSCH scheduling. The eNB can better distribute the DCIs in different DL sTTIs without impacting the UL sPUSCH transmission. When the same DL association set is used for sPDSCH HARQ-ACK feedback, any DL sTTI in the DL association set can be used for UL grant with method A2.

Figure 9:
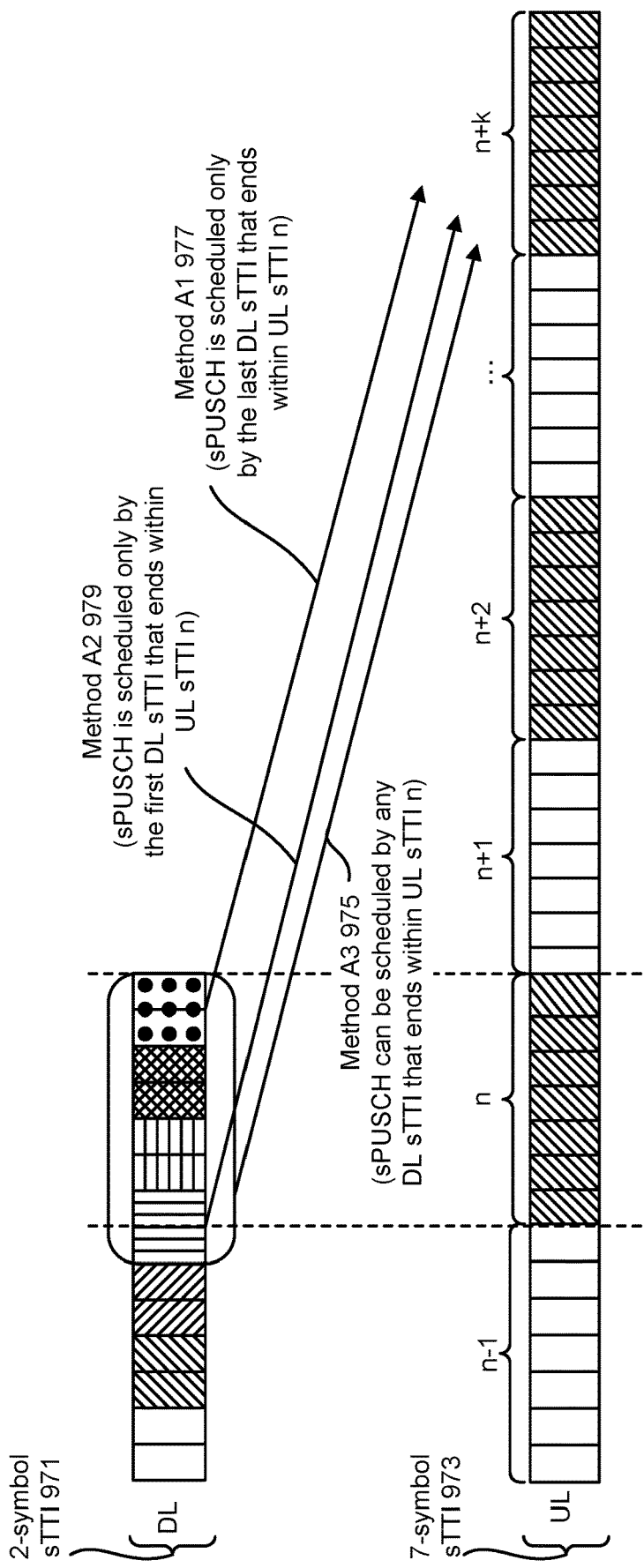
FIG. 9 is a diagram illustrating examples of physical uplink shared channel (PUSCH) scheduling timing with sTTI.

FIG. 9 is a diagram illustrating examples of PUSCH scheduling timing with sTTI. In particular, FIG. 9 illustrates an example of 2-symbol DL sTTI 971 and 7-symbol UL sTTI 973. As illustrated in FIG. 9, there may be 4 DL sTTIs within the UL sTTI n. With Method A1 977, only the last DL sTTI (of the 2-symbol DL sTTI 971) may be used to schedule an sPUSCH transmission in UL sTTI n+4 k. With the Method A2 979, only the first DL sTTI that ends within the UL sTTI n may be used to schedule an sPUSCH transmission in UL sTTI n+4.

Additionally, FIG. 9 illustrates that with Method A3 975, sPUSCH can be scheduled by any DL sTTI that ends within UL sTTI n.

More detail regarding HARQ-ACK feedback timing for a sPUSCH transmission is given as follows. The multiple DL sTTI mapped to a single UL sTTI issue also exists for HARQ-ACK feedback of a sPUSCH transmission on a DL sTTI, especially if sPHICH is specified and used. This timing also defines the minimum delay required for a DCI indicating for a retransmission of a sPUSCH.

For a sPUSCH operation, the processing time should be based on sPUSCH sTTI. With a processing time k or n+k+m if m is configured, for a sPUSCH transmission in sTTI n, the sPUSCH HARQ-ACK feedback should be reported in sTTI n+k or n+k+m if m is configured. In case the DL sTTI is smaller than UL sTTI, there are multiple DL sTTIs in the UL sTTI n+k or n+k+m if m is configured, similar methods can be defined for sPUSCH HARQ-ACk feedback as for the PUSCH scheduling.

In Method B1, the time the HARQ-ACK for a sPUSCH in sTTI n can be reported on a sPHICH or the earliest time the HARQ-ACK for a sPUSCH in sTTI n can be feedback by a new UL grant is the latest DL sTTI that ends within the range of UL sTTI n+k or n+k+m if m is configured. This provides slightly more processing time between a sPUSCH transmission and HARQ-ACK feedback. For consistency, if Method A1 977 above is used for UL sPUSCH scheduling, Method B1 here should be used for HARQ-ACK feedback timing of a sPUSCH transmission. When the same DL association set is used for sPDSCH HARQ-ACK feedback, only the last DL sTTI in the DL association set may be used for UL grant and sPHICH feedback with method B1.

In Method B2, the time the HARQ-ACK for a sPUSCH in sTTI n can be reported on a sPHICH or the earliest time the HARQ-ACK for a sPUSCH in sTTI n can be feedback by a new UL grant is the first DL sTTI that ends within the range of UL sTTI n+k or n+k+m if m is configured. This provides slightly faster HARQ-ACK feedback. For consistency, if Method A2 979 above is used for UL sPUSCH scheduling, Method B2 here should be used for HARQ-ACK feedback timing of a sPUSCH transmission. When the same DL association set is used for sPDSCH HARQ-ACK feedback, only the first DL sTTI in the DL association set can be used for UL grant and sPHICH feedback with Method B2.

In a variation of Method B2, the time the HARQ-ACK for a sPUSCH in sTTI n can be reported on a sPHICH or the earliest time the HARQ-ACK for a sPUSCH in sTTI n can be feedback by a new UL grant is the first DL sTTI that starts within the range of UL sTTI n+k or n+k+m if m is configured.

In Method B3, the HARQ-ACK for a sPUSCH in sTTI n can be reported in any DL sTTI that ends within the range of UL sTTI n+k or n+k+m if m is configured. In a case when sPHICH is used, the sPHICH should be located in the same DL sTTI position within the subframe as the DL sTTI that schedules the sPUSCH with a UL grant DCI. In a case of HARQ-ACK for a sPUSCH in sTTI n is feedback by a new UL grant, the earliest time is the same DL sTTI position within the subframe as the DL sTTI that schedules the sPUSCH with a UL grant DCI. When the same DL association set is used for sPDSCH HARQ-ACK feedback, any DL sTTI within the DL association set can be used for UL grant and sPHICH feedback with method B3, and the DL sTTI location should be the same for UL grant and sPHICH feedback within the DL association set.

Figure 10:
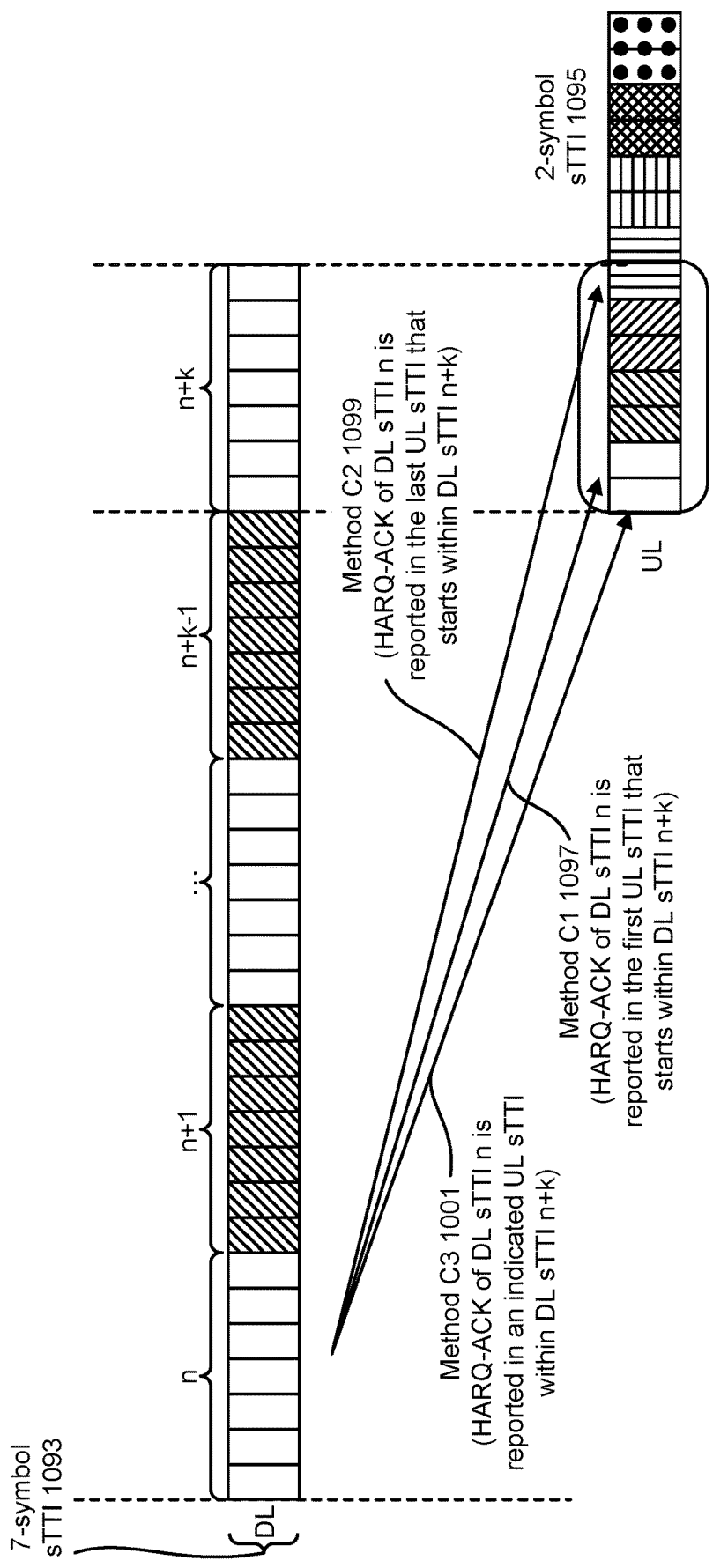
FIG. 10 is a diagram illustrating examples of PDSCH HARQ-ACK association with 7-symbol downlink (DL) sTTI and 2-symbol UL sTTI.

FIG. 10 is a diagram illustrating examples of PDSCH HARQ-ACK association with 7-symbol DL sTTI 1093 and 2-symbol UL sTTI 1095. In particular, FIG. 10 shows an example with 2-symbol UL sTTI 1095, and 7-symbol DL sTTI 1093.

In Case 2, the UL sTTI is shorter than the DL TTI. In Case 2, for FDD or FDD-TDD and primary cell frame structure 1, the UL sTTI size is smaller than the DL sTTI size. Thus, multiple UL sTTIs may be mapped to a single DL TTI or sTTI. The UL sTTI may be a sTTI for a sPUCCH, or a sPUSCH depending on the corresponding timing. The sTTI for a sPUSCH and a sPUCCH may be different.

More detail regarding sPDSCH HARQ-ACK feedback timing is given as follows. For the processing time of sPDSCH, the sTTI size refers to the sPDSCH sTTI for the DL data to DL HARQ feedback timing. For a sPDSCH transmission in sTTI n, the sPDSCH HARQ-ACK feedback is at least in n+k or n+k+m if m is configured. Because the UL sTTI is smaller than the DL sTTI, a DL sTTI n+k or n+k+m may contain multiple UL sTTIs. Thus, each DL sTTI may be linked to a UL association set. A UL association set includes all UL sTTIs that starts within a DL sTTI. Several methods may be considered to determine which UL sTTI should be used for the HARQ-ACK reporting. The UL sTTI may refer to the sTTI size of a sPUCCH. The UL sTTI may be the sTTI of a sPUSCH if a sPUSCH is scheduled in the reporting UL sTTI.

In Method C1 1097, the HARQ-ACK of a sPDSCH in DL sTTI n is reported in the first UL sTTI that starts within the range of DL sTTI n+k or n+k+m if m is configured. In other words, only the first UL sTTI in the UL association set may be used for HARQ-ACK feedback. This provides slightly lower latency between a sPDSCH and the HARQ-ACK feedback. FIG. 10 shows an example with 2-symbol UL sTTI and 7-symbol DL sTTI. There are 4 UL sTTIs within the DL sTTI n. With Method C1 1097, only the first UL sTTI starts within DL sTTI n+k is used to report HARQ-ACK for sPDSCH in DL sTTI n. In other words, only the first UL sTTI in the UL association set may be used for HARQ-ACK feedback.

As an alternative, the HARQ-ACK of a sPDSCH in DL sTTI n−4 may be reported in the earliest UL sTTI that ends within the range of DL sTTI n.

In Method C2 1099, the HARQ-ACK of a sPDSCH in DL sTTI n is reported in the last UL sTTI that starts within the range of DL sTTI n+k or n+k+m if m is configured. In other words, only the last UL sTTI in the UL association set may be used for HARQ-ACK feedback. This provides slightly longer time for the HARQ-ACK feedback. FIG. 10 shows an example with 2-symbol UL sTTI and 7-symbol DL sTTI. There are 4 UL sTTIs within the DL sTTI n. With Method C1 1099, only the last UL sTTI that starts within DL sTTI n is used to report HARQ-ACK for sPDSCH in DL sTTI n−4.

As an alternative, the HARQ-ACK of a sPDSCH in DL sTTI n may be reported in the last UL sTTI that ends within the range of DL sTTI n+k or n+k+m if m is configured.

In Method C3 1001, the HARQ-ACK of a sPDSCH in DL sTTI n may be reported in an indicated UL sTTIs that starts and/or ends within the range of the DL sTTI n. In other words, an indicated UL sTTI in the UL association set is used for HARQ-ACK feedback. This provides more flexibility of HARQ-ACK reporting and eNB scheduling. However, extra bits may be introduced in the DL sTTI n sPDSCH DCI format to indicate which UL sTTI is used for the HARQ-ACK report within DL sTTI n+k or n+k+m if m is configured. For example, an offset value may be used. If the offset value is 0, the first UL sTTI that starts within the range of DL sTTI n should be used to report HARQ-ACK. If the offset value is 1, the second UL sTTI that starts within the range of DL sTTI n should be used to report HARQ-ACK, and so on.

In FIG. 10, there are 4 UL sTTIs within the DL sTTI n. With Method C1 1097, only the first UL sTTI that starts within DL sTTI n may be used to report HARQ-ACK for sPDSCH in DL sTTI n−4. Alternatively, the HARQ-ACK of a sPDSCH in DL sTTI n−4 may be reported in the earliest UL sTTI that ends within the range of DL sTTI n. In the example of Method C1 1097 in FIG. 10, the UL sTTI immediately before may be used instead.

Additionally, FIG. 10 shows another example with 2-symbol UL sTTI 1095 and 7-symbol DL sTTI 1093. There are 4 UL sTTIs within the DL sTTI n. With Method C2 1099, only the last UL sTTI that ends within DL sTTI n may be used to report HARQ-ACK for sPDSCH in DL sTTI n−4.

Figure 11:
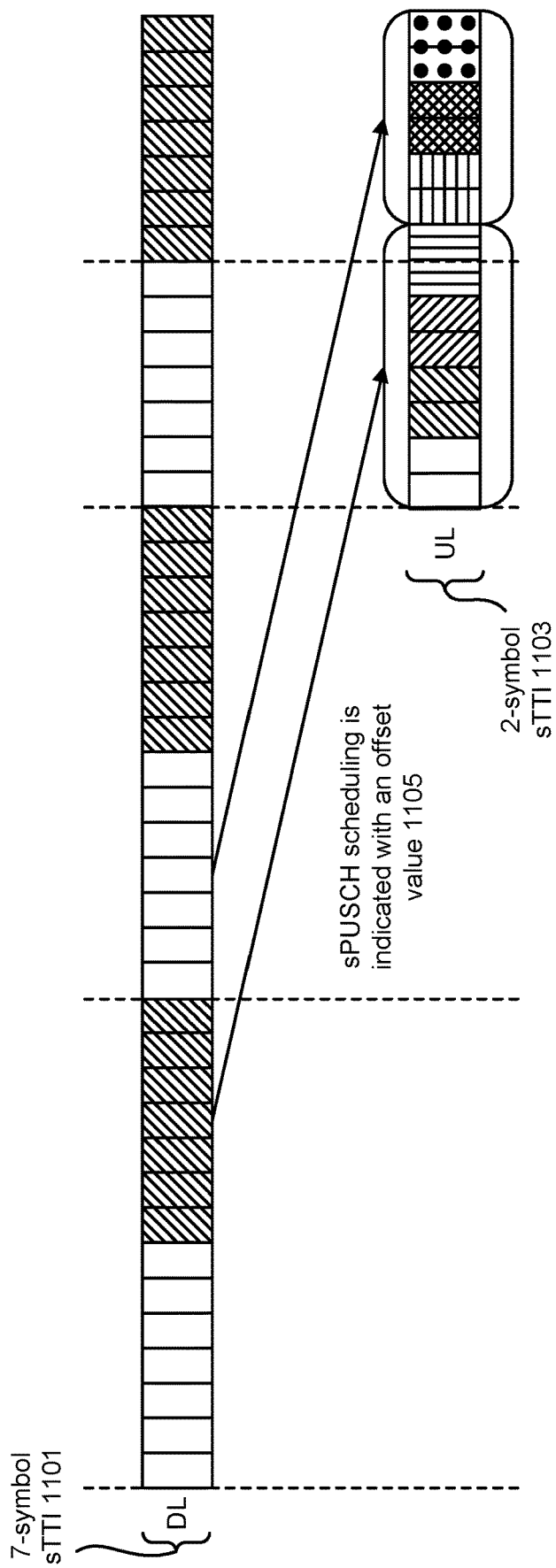
FIG. 11 is a diagram illustrating an example of sPUSCH scheduling from a DL sTTI.

FIG. 11 is a diagram illustrating an example of sPUSCH scheduling from a DL sTTI. In particular, FIG. 11 illustrates an example of 7-symbol sTTI 1101 and 2-symbol sTTI 1103.

More detail regarding sPUSCH scheduling and transmission timing is given as follows. For sPUSCH scheduling processing time, the sPUSCH sTTI may be used to determine the minimum processing time of n+k or n+k+m if m is configured. Because the UL sTTI is smaller than the DL sTTI, a DL sTTI may be used to schedule multiple DL sPUSCH, otherwise, only a limited number of UL sTTIs can be used for sPUSCH transmission. Thus, a UL scheduling sTTI set may be mapped to each DL sTTI based on the processing time. A UL scheduling sTTI set includes all UL sTTIs that starts within a DL sTTI, and can be the same as a UL association set.

Since there may be multiple UL sTTIs included in a DL sTTI, extra bits may be introduced in the DL sTTI n DCI format 0/4 to indicate which UL sTTI is scheduled for sPUSCH transmission within a UL scheduling sTTI set. For example in FIG. 11, the processing time k (or k+m if m is configured) is 8 UL 2-symbol sTTIs. A UL scheduling set is associated with a DL sTTI for sPUSCH scheduling. In this example, one UL scheduling set includes 4 2-symbol UL sTTIs, and one UL scheduling set includes 3 2-symbol UL sTTIs. The actual processing time for each UL sTTI in the UL association sets or UL scheduling sTTI sets are {8, 9, 10, 11}, {8.5, 9.5, 10.5} in terms of 2-symbol UL sTTI size. In another method, if an UL association set is treated as a DL sTTI, the processing time can be simplified to 3 DL sTTIs.

Thus, to simplify the sTTI indexing, the longer sTTI size can be used. In a case where DL sTTI is greater than UL sTTI, the sPUSCH scheduling processing time follows a n+k−1 or n+k+m−1 if m is configured rule based on the longer sTTI length (i.e., DL sTTI length).

An index value or offset value 1105 may be used in the UL grant DCI to indicate which UL sTTI is scheduled for sPUSCH transmission. If the offset value 1105 is 0, the first UL sTTI that starts within the range of DL sTTI n is scheduled for sPUSCH transmission. If the offset value 1105 is 1, the second UL sTTI that starts within the range of DL sTTI n is scheduled for sPUSCH transmission, and so on.

Figure 12:
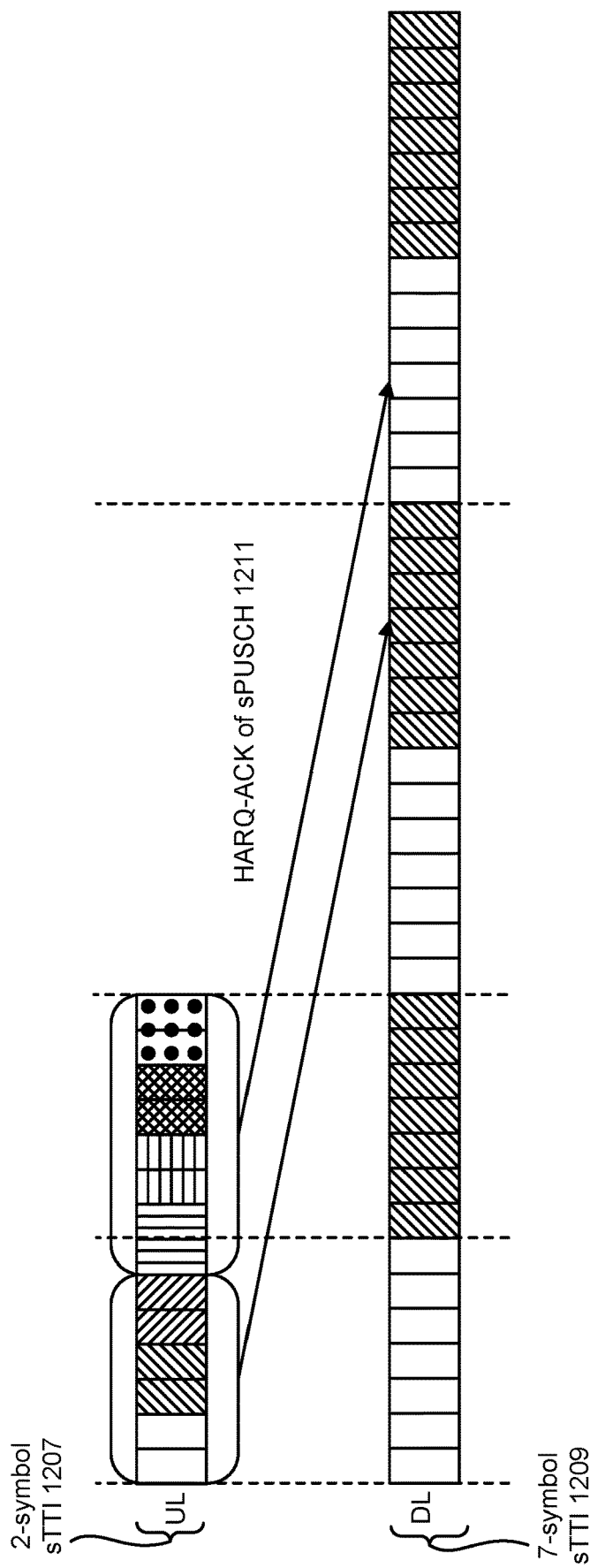
FIG. 12 is a diagram illustrating an example of sPUSCH HARQ-ACK feedback processing time.

FIG. 12 is a diagram illustrating an example of sPUSCH HARQ-ACK 1211 feedback processing time. In particular, FIG. 12 illustrates an example of 2-symbol sTTI 1207 and 7-symbol sTTI 1209.

More detail regarding HARQ-ACK feedback timing for a sPUSCH transmission is given as follows. The processing time for sPUSCH HARQ-ACK 1211 can be defined as follows: for a sPUSCH transmission in UL sTTI n, the sPUSCH HARQ-ACK 1211 can be reported at a minimum range of UL sTTI n+k or n+k+m if m is configured.

The multiple UL sTTI mapping to a single DL sTTI issue exists for HARQ-ACK feedback of a sPUSCH transmission on a DL sTTI, especially if sPHICH is specified and used. This timing also defines the minimum delay required for a DCI indicating for a retransmission of a sPUSCH. The UL sTTI refer to the sTTI size configured for sPUSCH for the HARQ-ACK feedback timing of sPUSCH transmission. For each DL sTTI can be linked to report the HARQ-ACK of a UL HARQ-ACK reporting association set. The UL HARQ-ACK reporting association set is defined based on the processing time. The UL HARQ-ACK reporting association set includes all sTTIs that end within a DL sTTI.

In the example illustrated in FIG. 12, the processing time k (or k+m if m is configured) is 8 UL 2-symbol sTTIs. A UL HARQ-ACK reporting association set is associated with a DL sTTI for sPUSCH HARQ-ACK 1211 feedback. In this example, one UL HARQ-ACK reporting association set includes 4 2-symbol UL sTTIs, and one UL association set includes 3 2-symbol UL sTTIs. It should be noted that the UL HARQ-ACK reporting association set for sPUSCH HARQ-ACK 1211 feedback can be different from the UL scheduling sTTI set for sPUSCH scheduling, as shown in this example.

The actual processing time for each UL sTTI in the UL HARQ-ACK reporting association sets {8.5, 9.5, 10.5}, {8, 9, 10, 11} in terms of 2-symbol UL sTTI size. In another method, if an UL association set is treated as a DL sTTI, the processing time can be simplified to 3 DL sTTIs.

Thus, to simplify the sTTI indexing, the longer sTTI size can be used. In a case where DL sTTI is greater than UL sTTI, the sPUSCH scheduling processing time may follow a n+k−1 or n+k+m−1 if m is configured rule based on the longer sTTI length (i.e., DL sTTI length).

Considering all cases of different sTTI lengths on DL and UL, to simplify the sTTI indexing, the longer sTTI size can be used to determine the sTTI index. For (i) sPDSCH HARQ-ACK feedback in the case where DL sTTI is smaller than UL sTTI, and (ii) sPUSCH scheduling in the case where DL sTTI is greater than UL sTTI, the minimum processing time may be defined as n+k−1 or n+k−1+m if m is configured in terms of the longer sTTI length between DL and UL. In other cases, the processing time may be n+k or n+k+m if m is configured.

As discussed above, in a case of different sTTI sizes for DL and UL, the sPDSCH processing time may be based on sPDSCH sTTI, and sPUSCH processing time may be based on sPUSCH sTTI. There are some potential issues for sPDSCH HARQ-ACK reporting. For example, if a sPDSCH and a UL grant are transmitted in a DL sTTI for a given UE, the HARQ-ACK may not be reported on the scheduled sPUSCH because the processing time for sPUSCH and sPDSCH HARQ-ACK are different.

To avoid the timing problem, in a case of different DL sTTI and UL sTTI sizes, the longer sTTI size between DL and UL may be used to determine the processing time, the k, and m if configured should be based on the longer sTTI size between the UL and UL as well.

Figure 13:
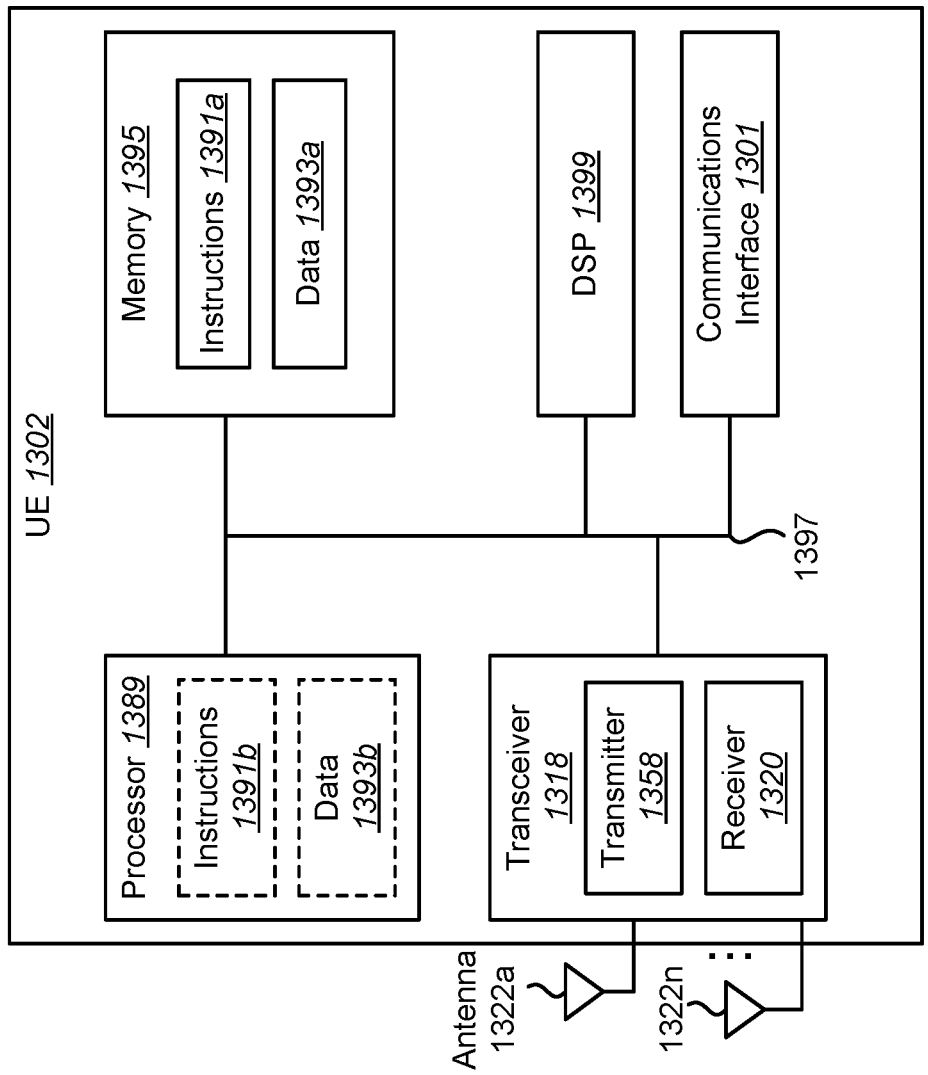
FIG. 13 illustrates various components that may be utilized in a UE.

FIG. 13 illustrates various components that may be utilized in a UE 1302. The UE 1302 described in connection with FIG. 13 may be implemented in accordance with the UE 102 described in connection with FIG. 1. The UE 1302 includes a processor 1389 that controls operation of the UE 1302. The processor 1389 may also be referred to as a central processing unit (CPU). Memory 1395, which may include read-only memory (ROM), random access memory (RAM), a combination of the two or any type of device that may store information, provides instructions 1391a and data 1393a to the processor 1389. A portion of the memory 1395 may also include non-volatile random access memory (NVRAM). Instructions 1391b and data 1393b may also reside in the processor 1389. Instructions 1391b and/or data 1393b loaded into the processor 1389 may also include instructions 1391a and/or data 1393a from memory 1395 that were loaded for execution or processing by the processor 1389. The instructions 1391b may be executed by the processor 1389 to implement method 200 described above.

The UE 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322a-n are attached to the housing and electrically coupled to the transceiver 1318.

The various components of the UE 1302 are coupled together by a bus system 1397, which may include a power bus, a control signal bus and a status signal bus, in addition to a data bus. However, for the sake of clarity, the various buses are illustrated in FIG. 13 as the bus system 1397. The UE 1302 may also include a digital signal processor (DSP) 1399 for use in processing signals. The UE 1302 may also include a communications interface 1301 that provides user access to the functions of the UE 1302. The UE 1302 illustrated in FIG. 13 is a functional block diagram rather than a listing of specific components.

Figure 14:
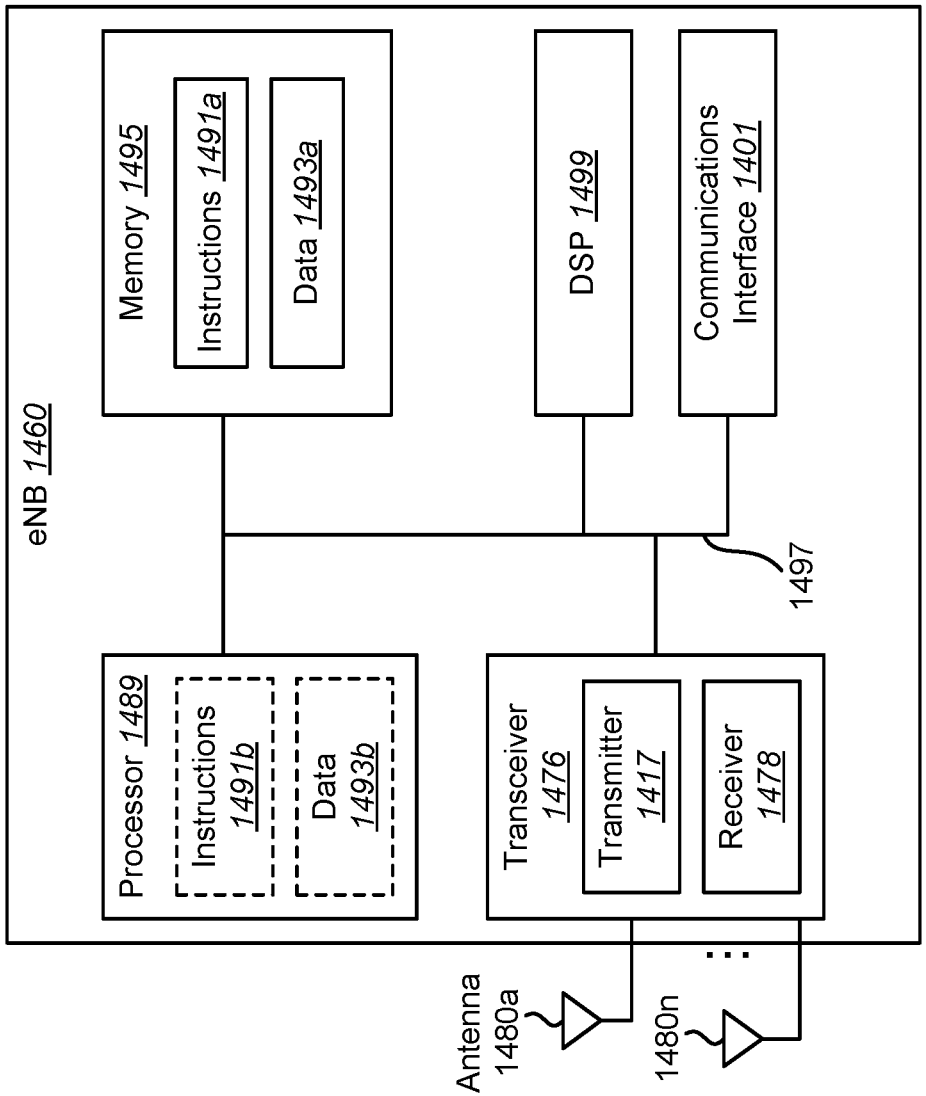
FIG. 14 illustrates various components that may be utilized in an eNB.

FIG. 14 illustrates various components that may be utilized in an eNB 1460. The eNB 1460 described in connection with FIG. 14 may be implemented in accordance with the eNB 160 described in connection with FIG. 1. The eNB 1460 includes a processor 1489 that controls operation of the eNB 1460. The processor 1489 may also be referred to as a central processing unit (CPU). Memory 1495, which may include read-only memory (ROM), random access memory (RAM), a combination of the two or any type of device that may store information, provides instructions 1491a and data 1493a to the processor 1489. A portion of the memory 1495 may also include non-volatile random access memory (NVRAM). Instructions 1491b and data 1493b may also reside in the processor 1489. Instructions 1491b and/or data 1493b loaded into the processor 1489 may also include instructions 1491a and/or data 1493a from memory 1495 that were loaded for execution or processing by the processor 1489. The instructions 1491b may be executed by the processor 1489 to implement method 200 described above.

The eNB 1460 may also include a housing that contains one or more transmitters 1417 and one or more receivers 1478 to allow transmission and reception of data. The transmitter(s) 1417 and receiver(s) 1478 may be combined into one or more transceivers 1476. One or more antennas 1480a-n are attached to the housing and electrically coupled to the transceiver 1476.

The various components of the eNB 1460 are coupled together by a bus system 1497, which may include a power bus, a control signal bus and a status signal bus, in addition to a data bus. However, for the sake of clarity, the various buses are illustrated in FIG. 14 as the bus system 1497. The eNB 1460 may also include a digital signal processor (DSP) 1499 for use in processing signals. The eNB 1460 may also include a communications interface 1401 that provides user access to the functions of the eNB 1460. The eNB 1460 illustrated in FIG. 14 is a functional block diagram rather than a listing of specific components.

Figure 15:
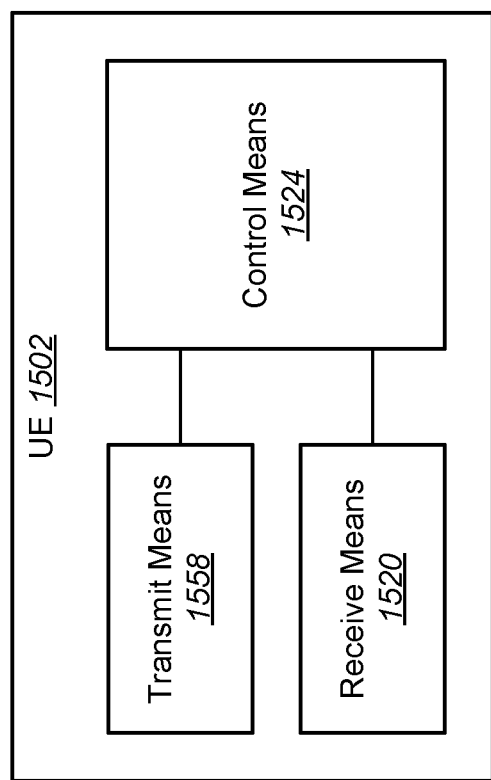
FIG. 15 is a block diagram illustrating one implementation of a UE in which systems and methods for FDD TTI operation may be implemented.

FIG. 15 is a block diagram illustrating one implementation of a UE 1502 in which systems and methods for FDD TTI operation may be implemented. The UE 1502 includes transmit means 1558, receive means 1520 and control means 1524. The transmit means 1558, receive means 1520 and control means 1524 may be configured to perform one or more of the functions described in connection with one or more of FIGS. 1-2 above. FIG. 13 above illustrates one example of a concrete apparatus structure of FIG. 15. Other various structures may be implemented to realize one or more of the functions of FIG. 1. For example, a DSP may be realized by software.

Figure 16:
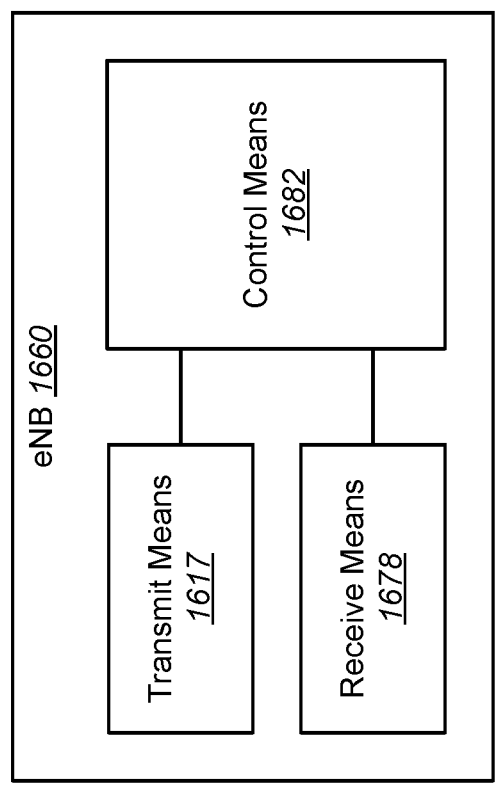
FIG. 16 is a block diagram illustrating one implementation of an eNB in which systems and methods for FDD TTI operation may be implemented.

FIG. 16 is a block diagram illustrating one implementation of an eNB 1660 in which systems and methods for FDD TTI operation may be implemented. The eNB 1660 includes transmit means 1617, receive means 1678 and control means 1682. The transmit means 1617, receive means 1678 and control means 1682 may be configured to perform one or more of the functions described in connection with one or more of FIGS. 1-2 above. FIG. 14 above illustrates one example of a concrete apparatus structure of FIG. 16. Other various structures may be implemented to realize one or more of the functions of FIG. 1. For example, a DSP may be realized by software.

The term "computer-readable medium" refers to any available medium that may be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer or processor. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above.

Various modifications, changes and variations may be made in the arrangement, operation and details of the systems, methods, and apparatus described herein without departing from the scope of the claims.

A program running on the eNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium may be distributed or the program may be transmitted to a server computer that connects through a network such as the Internet. In this case, a storage device in the server computer also is included. Furthermore, some or all of the eNB 160 and the UE 102 according to the systems and methods described above may be realized as an LSI that is a typical integrated circuit. Each functional block of the eNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment (UE), comprising:
receiving circuitry configured to receive a physical downlink shared channel (PDSCH); and
transmitting circuitry configured to transmit a physical uplink control channel (PUCCH); wherein
if a downlink (DL) shortened transmission time interval (sTTI) is smaller than an uplink (UL) sTTI, and if a larger-size PUCCH format is configured, (i) a smaller-size PUCCH format is used when one PDSCH is detected and (ii) whether the larger-size PUCCH format thus configured or the smaller-size PUCCH format is used for the UL sTTI which is larger than the DL sTTI depends on the number of detected PDSCH(s).

2. A base station apparatus, comprising:
transmitting circuitry configured to transmit a physical downlink shared channel (PDSCH);
receiving circuitry configured to receive a physical uplink control channel (PUCCH) from a user equipment (UE); and
configuring circuitry configured to configure, for the UE, a downlink (DL) shortened transmission time interval (sTTI) and an uplink (UL) sTTI;
wherein
if the downlink (DL) shortened transmission time interval (sTTI) is smaller than the uplink (UL) sTTI, and if the configuring circuitry further configures a larger-size PUCCH format for the UE, (i) the receiving circuitry receives, from the UE, the PUCCH using a smaller-size PUCCH format when the PUCCH corresponds to one PDSCH and (ii) whether the larger-size PUCCH format thus configured or the smaller-size PUCCH format is used for the UL sTTI which is larger than the DL sTTI depends on the number of detected PDSCH(s).

3. A method for a user equipment (UE), the method comprising:
receiving a physical downlink shared channel (PDSCH); and
transmitting a physical uplink control channel (PUCCH); wherein
if a downlink (DL) shortened transmission time interval (sTTI) is smaller than an uplink (UL) sTTI, and if a larger-size PUCCH format is configured, (i) a smaller-size PUCCH format is used when one PDSCH is detected and (ii) whether the larger-size PUCCH format thus configured or the smaller-size PUCCH format is used for the UL sTTI which is larger than the DL sTTI depends on the number of detected PDSCH(s).

4. A method for a base station apparatus, the method comprising:
transmitting a physical downlink shared channel (PDSCH);
receiving a physical uplink control channel (PUCCH) from a user equipment (UE); and
configuring, for the UE, a downlink (DL) shortened transmission time interval (sTTI) and an uplink (UL) sTTI; wherein
if the downlink (DL) shortened transmission time interval (sTTI) is smaller than the uplink (UL) sTTI, and if the configuring includes configuring a larger-size PUCCH format for the UE, (i) the receiving includes receiving, from the UE, the PUCCH using a smaller-size PUCCH format when the PUCCH corresponds to one PDSCH and (ii) whether the larger-size PUCCH format thus configured or the smaller-size PUCCH format is used for the UL sTTI which is larger than the DL sTTI depends on the number of detected PDSCH(s).

* * * * *